US008208818B2

(12) United States Patent
Sasai

(10) Patent No.: US 8,208,818 B2
(45) Date of Patent: Jun. 26, 2012

(54) OPTICAL FREE SPACE TRANSMISSION SYSTEM USING VISIBLE LIGHT AND INFRARED LIGHT

(75) Inventor: Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 597 days.

(21) Appl. No.: 12/439,050

(22) PCT Filed: Oct. 22, 2007

(86) PCT No.: PCT/JP2007/070575
§ 371 (c)(1),
(2), (4) Date: Feb. 26, 2009

(87) PCT Pub. No.: WO2008/050729
PCT Pub. Date: May 2, 2008

(65) Prior Publication Data
US 2009/0208221 A1 Aug. 20, 2009

(30) Foreign Application Priority Data

Oct. 23, 2006 (JP) .................................. 2006-287806

(51) Int. Cl.
*H04B 10/00* (2006.01)
*H04B 10/10* (2006.01)
(52) U.S. Cl. ........................................ 398/185; 398/189
(58) Field of Classification Search .................. 398/191, 398/118–131, 185
See application file for complete search history.

(56) References Cited

U.S. PATENT DOCUMENTS

| 2002/0167701 A1 | 11/2002 | Hirata |
| 2003/0063346 A1 | 4/2003 | Pez et al. |
| 2004/0247323 A1 | 12/2004 | Morioka et al. |
| 2006/0056855 A1 * | 3/2006 | Nakagawa et al. ............ 398/183 |

FOREIGN PATENT DOCUMENTS

| JP | 08-242210 | 9/1996 |
| JP | 11-331086 | 11/1999 |
| JP | 2002-290335 | 10/2002 |
| JP | 2003-115823 | 4/2003 |
| JP | 2003-318836 | 11/2003 |
| JP | 2004-282389 | 10/2004 |
| JP | 2004-363756 | 12/2004 |

OTHER PUBLICATIONS

International Search Report mailed Nov. 27, 2007 for International Application No. PCT/JP2007/070575.

(Continued)

*Primary Examiner* — Danny Leung
(74) *Attorney, Agent, or Firm* — Wenderoth, Lind & Ponack, L.L.P.

(57) ABSTRACT

A first modulation section performs low-speed digital modulation of first data. A second modulation section performs high-speed digital modulation of second data. A first light transmitting section alternately emits and quenches visible light in accordance with an output signal of the first modulation section to transmit a visible light signal which conveys the first data. A second light transmitting section changes an intensity of the infrared light in accordance with an output signal of the second modulation section to transmit an infrared light signal, which conveys the second data, in parallel with the visible light signal.

12 Claims, 14 Drawing Sheets

OTHER PUBLICATIONS

Shinpei Miyahara et al., "Preproduction of LED driver for Visible Light Communications and Evaluation of response performance of visible LED", IEICE Technical Report, vol. 105, No. 184, IEICE Jul. 7, 2005, pp. 25-30 w/Abstract.

Shimpei Miyahara, Satoshi Aono, and Yoshinori Matsumoto, "Preproduction of LED Driver for Visible Light Communications and Evaluation of Response Performance of Visible LED", IEICE Technical Report (The Institute of Electronics, Information and Communication Engineers) (ICD2005-44) The Institute of Electronics, Information and Communication Engineers, Jul. 7, 2005, vol. 105, No. 184, pp. 25-30 w/partial English translation.

* cited by examiner

F I G. 1
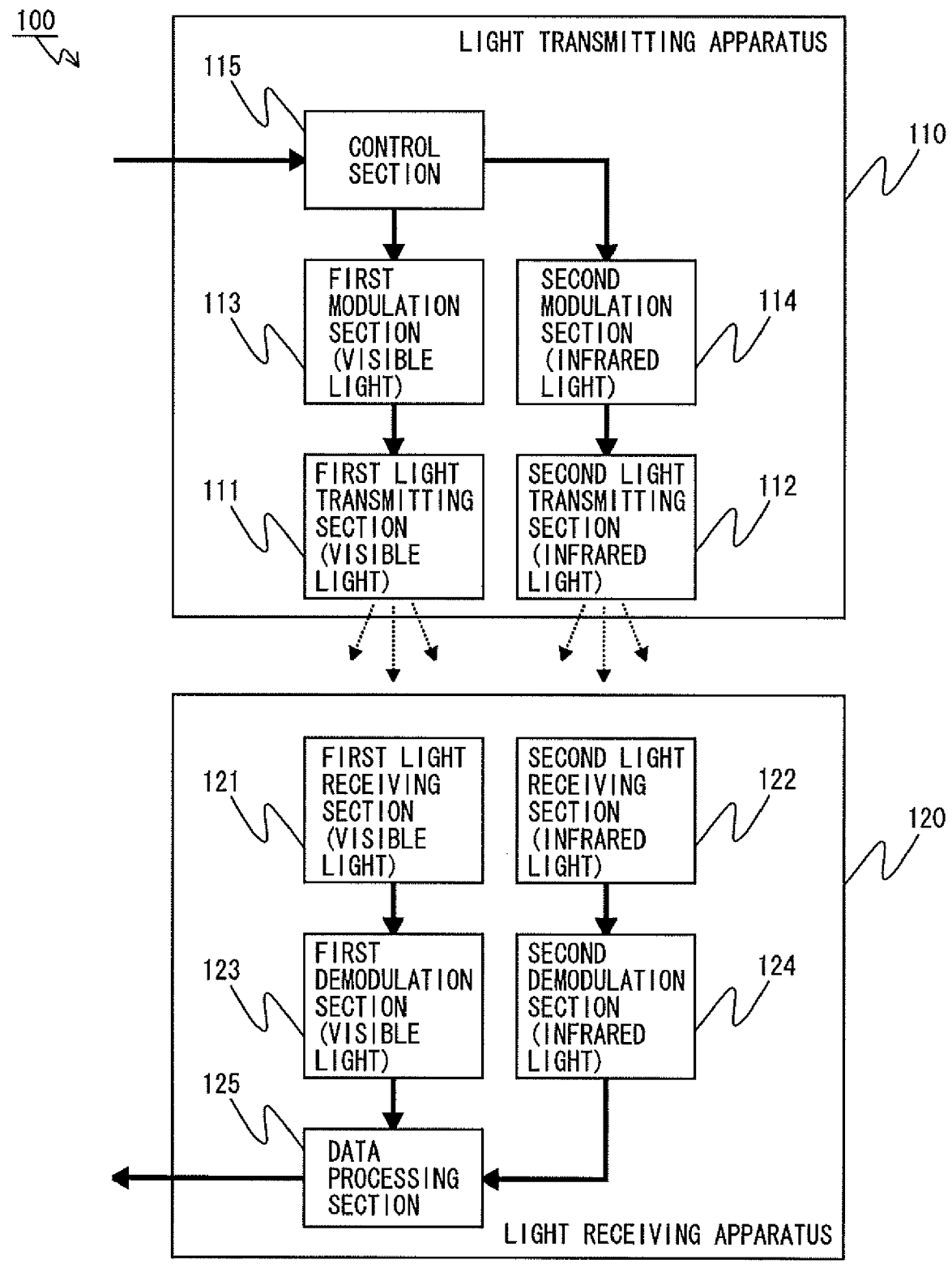

F I G. 3
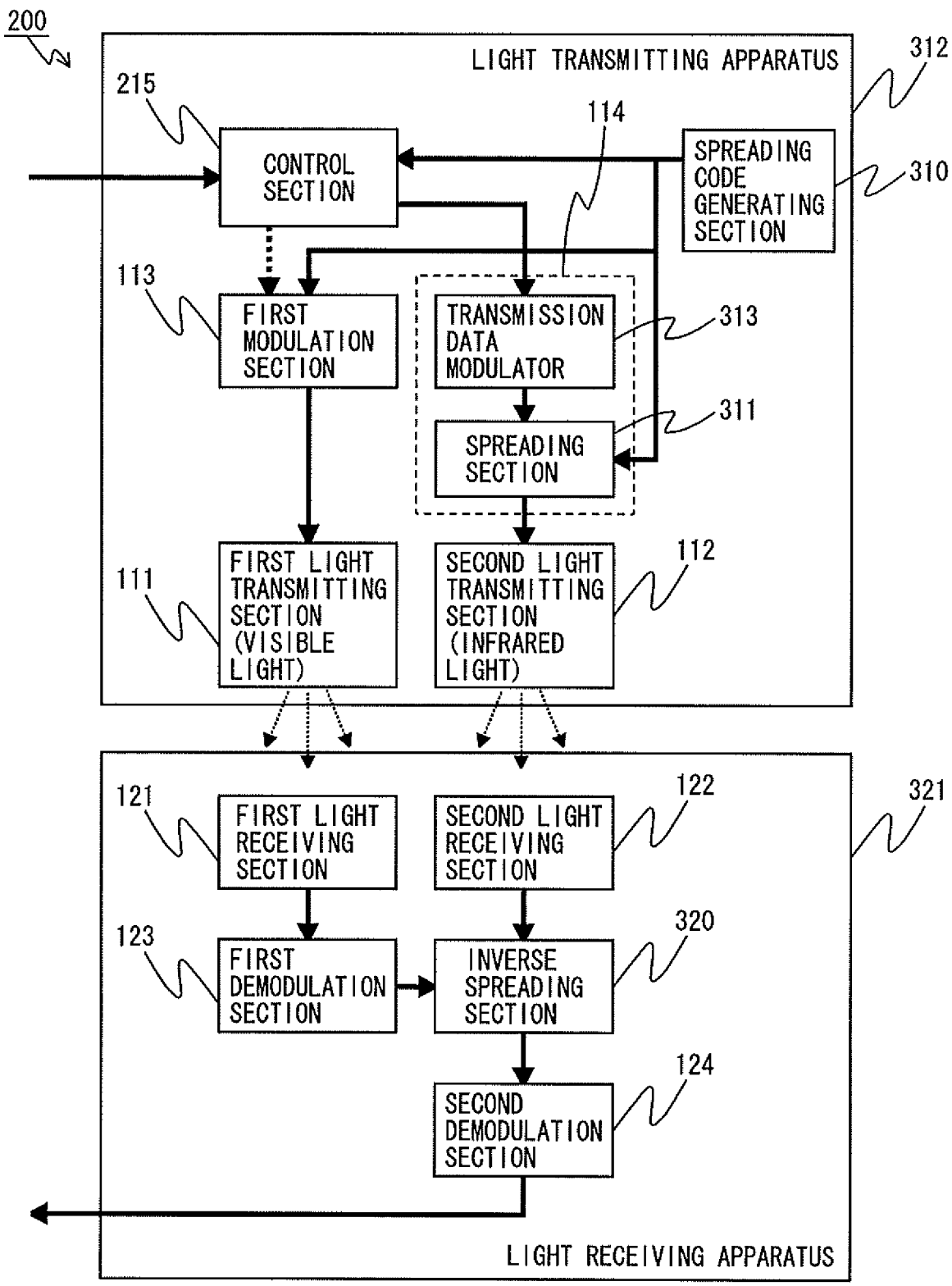

OPTICAL FREE SPACE TRANSMISSION SYSTEM USING VISIBLE LIGHT AND INFRARED LIGHT

TECHNICAL FIELD

The present invention relates to optical free space transmission technology using light as radio signals, and more particularly, to an optical free space transmission system using both visible light and infrared light.

BACKGROUND ART

As a conventional art, there is an illumination light communication apparatus which performs communication using a light source, which emits visible light used for illumination and infrared light not used for illumination, while causes information, which is to be transmitted, to be included in the visible light and the infrared light. One example of such an illumination light communication apparatus is disclosed in Patent Document 1. FIG. 14 is a view showing a configuration of an illumination light communication apparatus 600 in the Patent Document 1. The following will briefly describe the operation of the illumination light communication apparatus 600 with reference to FIG. 14. First, in the case of performing communication using illumination light (visible light) when the illumination is on, the illumination light communication apparatus 600 causes switches 512 and 513 to be in the connection state. Then, a light modulation section 511 generates a signal obtained by modulating information which is to be transmitted. An electric power distributor 515 superimposes this signal on the waveform of electric power, which is used for performing illumination, and activates an illumination section 516. Thus, the illumination light communication apparatus 600 is capable of performing optical communication using visible light while causing the communication operation to be included in the illumination operation. On the other hand, in the case of performing communication when the illumination is off, the illumination light communication apparatus 600 causes the switches 512 and 513 to be in the disconnection state and a switch 514 to be in the connection state. Then, the light modulation section 511 activates a communication section 517 which emits infrared light. Thus, the illumination light communication apparatus 600 is capable of performing communication using infrared light even when the illumination is off.

As described above, the illumination light communication apparatus 600 is capable of not only performing communication when the illumination is on and but also performing communication while keeping the illumination off when the illumination is off. It is noted that because the illumination section 516 and the communication section 517 can be combined into one light-emitting element, a compact system configuration is possible.

[Patent Document 1] Japanese Patent Laid-open Publication No. 2004-282389

SUMMARY OF THE INVENTION

Problems to be Solved by the Invention

However, an illumination light communication system using the above conventional illumination light communication apparatus has a problem that optical communication is performed only at a low speed when the illumination is on due to the following reasons.

(1) Because light receiving sensitivity by a silicon-based light receiving element provided in a light receiving apparatus is generally poor in a wavelength band (visible light band) used for illumination light communication, it is difficult to perform high-speed communication.

(2) High output power and high-speed response required for an illumination light source (a white LED and the like) are incompatible with each other to have a tradeoff relationship. In an illumination light communication system configured to have an illumination device to which a communication function is added, because the illumination function is given priority over the communication function, a light source which gives priority to high output power over high-speed response is used. Thus, it is difficult to perform high-speed communication.

Therefore, an object of the present invention is to provide an optical free space transmission system which uses visible light and infrared light and which enables significant increase of a communication speed even when illumination is on.

Solution to the Problems

The present invention is directed to a light transmitting apparatus for transmitting transmission data using visible light and infrared light. To achieve the above objects, the light transmitting apparatus of the present invention comprises a first modulation section for performing low-speed digital modulation of first data; a second modulation section for performing high-speed digital modulation of second data; a first light transmitting section for emitting/quenching the visible light in accordance with an output signal of the first modulation section to transmit a visible light signal which conveys the first data; and a second light transmitting section for changing the intensity of the infrared light in accordance with an output signal of the second modulation section to transmit an infrared light signal, which conveys the second data, in parallel with the visible light signal.

Further, preferably, the high-speed digital modulation performed by the second modulation section is standard modulation or high-rate transmission modulation having a higher data transmission rate than the standard modulation, and the light transmitting apparatus further comprises a control section for causing the second light transmitting section to emit the infrared light signal in accordance with an output signal of the second modulation section, which has been subjected to the standard modulation, during a period of emitting the visible light signal, and to emit the infrared light signal in accordance with an output signal of the second modulation section, which has been subjected to the high-rate transmission modulation, during a period of quenching the visible light signal.

Further, the first data and the second data may be obtained by separating the transmission data by means of the control section.

Further, the light transmitting apparatus may also comprise a spreading code generating section for generating a spreading code, the first data may be the spreading code, the second data may be the transmission data, and after performing the standard modulation or the high-rate transmission modulation of the transmission data, the second modulation section may spread the transmission data by using the spreading code.

Further, after performing the low-speed digital modulation of the spreading code, the first modulation section may convert the spreading code into an electric signal of a low frequency band, and after spreading the transmission data, the second modulation section may convert the transmission data into an electric signal of a high frequency band which does not overlap with the low frequency band.

Further, the first data may be information indicative of the installed location of the light transmitting apparatus, and the spreading code may be uniquely assigned to the installed location of the light transmitting apparatus Further, the second data may be the transmission data, and the first data may be a reference frequency signal used for generating a clock signal used for the high-speed digital modulation performed to the transmission data.

Further, the high-speed digital modulation performed by the second modulation section may be standard modulation or high-rate transmission modulation having a higher data transmission rate than the standard modulation, and the light transmitting apparatus may further comprise a control section for causing the second light transmitting section to emit the infrared light signal in accordance with an output signal of the second modulation section, which has been subjected to the standard modulation, during a period of emitting the visible light signal, and to emit the infrared light signal in accordance with an output signal of the second modulation section, which has been subjected to the high-rate transmission modulation, during a period of quenching the visible light signal.

Further, the first light transmitting section may simultaneously activate light-emitting diodes, which emit visible lights of three primary colors, respectively, to emit white light, and may transmit the visible light signal which conveys the first data by emitting/quenching at least one of the visible lights of the three primary colors.

Further, the present invention is directed to an optical free space transmission system for transmitting transmission data between a light transmitting apparatus and a light receiving apparatus using visible light and infrared light. To achieve the above objects, the optical free space transmission system of the present invention comprises a light transmitting apparatus and a light receiving apparatus. The light transmitting apparatus includes a first modulation section for performing low-speed digital modulation of first data; a second modulation section for performing high-speed standard digital modulation or high-rate transmission digital modulation, which has a higher data transmission rate than high-speed standard digital modulation, of second data; a first light transmitting section for emitting/quenching the visible light in accordance with an output signal of the first modulation section to transmit a visible light signal which conveys the first data; a second light transmitting section for changing the intensity of the infrared light in accordance with an output signal of the second modulation section to transmit an infrared light signal which conveys the second data; and a control section for separating the transmission data into the first data and the second data, and for causing the second light transmitting section to emit the infrared light signal in accordance with an output signal of the second modulation section, which has been subjected to the high-speed standard digital modulation, during a period of emitting the visible light signal, and to emit the infrared light signal in accordance with an output signal of the second modulation section, which has been subjected to the high-rate transmission digital modulation, during a period of quenching the visible light signal. The light receiving apparatus includes a first light receiving section for receiving the visible light signal; a second light receiving section for receiving the infrared light signal; a first demodulation section for demodulating the first data from an output signal of the first light receiving section; a second demodulation section for demodulating the second data from an output signal of the second light receiving section; and a data processing section for combining the first data and the second data to reconstruct the transmission data.

Further, the first light transmitting section may simultaneously activate light-emitting diodes, which emit visible lights of three primary colors, respectively, to emit white light, and may transmit the visible light signal which conveys the first data by emitting/quenching at least one of the visible lights of the three primary colors.

Further, the light receiving apparatus may also include a third light transmitting section for transmitting a transmission request signal, which requests start of transmitting the transmission data, to the light transmitting apparatus by using a light signal, the light transmitting apparatus may also include a third light receiving section for receiving the transmission request signal, and the control section may start to transmit the transmission data in accordance with the transmission request signal.

Further, to achieve the above objects, the optical free space transmission system of the present invention may comprise a light transmitting apparatus and a light receiving apparatus. The light transmitting apparatus may include a spreading code generating section for generating a spreading code; a first modulation section for performing low-speed digital modulation of the spreading code; a second modulation section for performing high-speed standard digital modulation or high-rate transmission digital modulation, which has a higher data transmission rate than the high-speed standard digital modulation, of the transmission data, and for spreading the transmission data by using the spreading code; a first light transmitting section for emitting/quenching the visible light in accordance with an output signal of the first modulation section to transmit a visible light signal which conveys the spreading code; a second light transmitting section for changing the intensity of the infrared light in accordance with an output signal of the second modulation section to transmit an infrared light signal which conveys the transmission data; and a control section for causing the second light transmitting section to emit the infrared light signal in accordance with an output signal of the second modulation section, which has been subjected to the high-speed standard digital modulation, during a period of emitting the visible light signal, and to emit the infrared light signal in accordance with an output signal of the second modulation section, which has been subjected to the high-rate transmission digital modulation, during a period of quenching the visible light signal. The light receiving apparatus may include a first light receiving section for receiving the visible light signal; a second light receiving section for receiving the infrared light signal; a first demodulation section for demodulating the spreading code from an output signal of the first light receiving section; an inverse spreading section for inverse-spreading an output signal of the second light receiving section by using the spreading code; and a second demodulation section for demodulating the transmission data from an output signal of the inverse spreading section.

Further, the first light transmitting section may simultaneously activate light-emitting diodes, which emit visible lights of three primary colors, respectively, to emit white light, and may transmit the visible light signal which conveys the spreading code by emitting/quenching at least one of the visible lights of the three primary colors.

Further, the light receiving apparatus may also include a third light transmitting section for transmitting a transmission request signal, which requests start of transmitting the transmission data, to the light transmitting apparatus by using a light signal, the light transmitting apparatus may also include a third light receiving section for receiving the transmission request signal, and the control section may start to transmit the transmission data in accordance with the transmission request signal.

Further, to achieve the above objects, the optical free space transmission system of the present invention may comprise a light transmitting apparatus and a light receiving apparatus. The light transmitting apparatus may include a spreading code generating section for generating a spreading code; a first modulation section for performing low-speed digital modulation of the spreading code, and for converting the spreading code into an electric signal of a low frequency band; a second modulation section for performing high-speed standard digital modulation or high-rate transmission digital modulation, which has a higher data transmission rate than the high-speed standard digital modulation, of the transmission data, for spreading the transmission data by using the spreading code, and for converting the transmission data into an electric signal of a high frequency band which does not overlap with the low frequency band; a first light transmitting section for emitting/quenching the visible light in accordance with an output signal of the first modulation section to transmit a visible light signal which conveys the spreading code; a second light transmitting section for changing the intensity of the infrared light in accordance with an output signal of the second modulation section to transmit an infrared light signal which conveys the transmission data; and a control section for causing the second light transmitting section to emit the infrared light signal in accordance with an output signal of the second modulation section, which has been subjected to the high-speed standard digital modulation, during a period of emitting the visible light signal, and to emit the infrared light signal in accordance with an output signal of the second modulation section, which has been subjected to the high-rate transmission digital modulation, during a period of quenching the visible light signal. The light receiving apparatus may include a first light receiving section for receiving the visible light signal and the infrared light signal; a first filter section for extracting the electric signal of the low frequency band; a second filter section for extracting the electric signal of the high frequency band; a first demodulation section for demodulating the spreading code from an output signal of the first filter section; an inverse spreading section for inverse-spreading an output signal of the second filter section by using the spreading code; and a second demodulation section for demodulating the transmission data from an output signal of the inverse spreading section.

Further, the first light transmitting section may simultaneously activate light-emitting diodes, which emit visible lights of three primary colors, respectively, to emit white light, and may transmit the visible light signal which conveys the spreading code by emitting/quenching at least one of the visible lights of the three primary colors.

Further, the light receiving apparatus may also include a third light transmitting section for transmitting a transmission request signal, which requests start of transmitting the transmission data, to the light transmitting apparatus by using a light signal, the light transmitting apparatus may also include a second light receiving section for receiving the transmission request signal, and the control section may start to transmit the transmission data in accordance with the transmission request signal.

Further, the first data may be information indicative of the installed location of the light transmitting apparatus, and the spreading code may be uniquely assigned to the installed location of the light transmitting apparatus.

Further, to achieve the above objects, the optical free space transmission system of the present invention may comprise a light transmitting apparatus and a light receiving apparatus. The light transmitting apparatus may include a first modulation section for performing low-speed digital modulation of a reference frequency signal used for generating a clock signal; a second modulation section performing high-speed standard digital modulation or high-rate transmission digital modulation, which has a higher data transmission rate than the high-speed standard digital modulation, of the transmission data by using the clock signal generated from the reference frequency signal; a first light transmitting section for emitting/quenching the visible light in accordance with an output signal of the first modulation section to transmit a visible light signal which conveys the reference frequency signal; a second light transmitting section for changing the intensity of the infrared light in accordance with an output signal of the second modulation section to transmit an infrared light signal which conveys the transmission data; and a control section for causing the second light transmitting section to emit the infrared light signal in accordance with an output signal of the second modulation section, which has been subjected to the high-speed standard digital modulation, during a period of emitting the visible light signal, and to emit the infrared light signal in accordance with an output signal of the second modulation section, which has been subjected to the high-rate transmission digital modulation, during a period of quenching the visible light signal. The light receiving apparatus may include a first light receiving section for receiving the visible light signal; a second light receiving section for receiving the infrared light signal; a first demodulation section for demodulating the reference frequency signal from an output signal of the first light receiving section; and a second demodulation section for generating the clock signal from the reference frequency signal, and for demodulating the transmission data from an output signal of the second light receiving section by using the clock signal.

Further, the first light transmitting section may simultaneously activate light-emitting diodes, which emit visible lights of three primary colors, respectively, to emit white light, and may transmit the visible light signal which conveys the reference frequency signal by emitting/quenching at least one of the visible lights of the three primary colors.

Further, the light receiving apparatus may also include a third light transmitting section for transmitting a transmission request signal, which requests start of transmitting the transmission data, to the light transmitting apparatus by using a light signal, the light transmitting apparatus may also include a third light receiving section for receiving the transmission request signal, and the control section may start to transmit the transmission data in accordance with the transmission request signal.

Effect of the Invention

As described above, according to the optical free space transmission system of the present invention using visible light and infrared light, because infrared communication capable of being performed at a high speed can be performed in parallel with visible light communication even when the illumination is on, significant increase of a communication speed is possible.

BRIEF DESCRIPTION OF THE DRAWINGS

FIG. 1 is a view showing an exemplary configuration of an optical free space transmission system 100 according to a first embodiment of the present invention.

FIG. 3 is a view showing an exemplary configuration of an optical free space transmission system 200 according to a second embodiment of the present invention.

Figure 2:
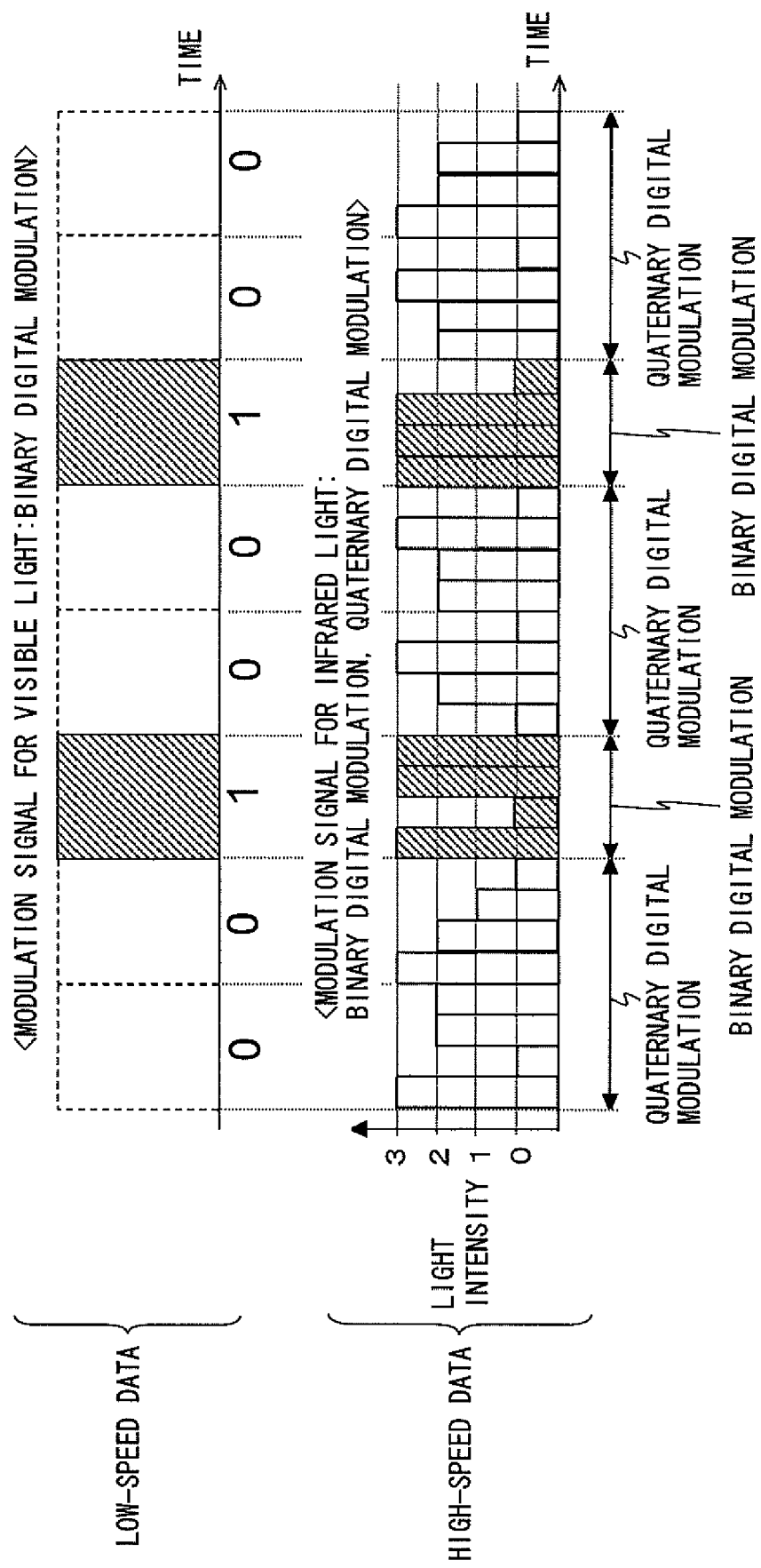
FIG. 2 is a view showing the waveform of a modulation signal for visible light outputted by a first modulation section 113 of the optical free space transmission system 100 and the waveform of a modulation signal for infrared light outputted by a second modulation section 114 of the optical free space transmission system 100.

DESCRIPTION OF THE REFERENCE CHARACTERS 100, 200, 300, 400, 500 optical free space transmission system
110, 312, 450 light transmitting apparatus
111 first light transmitting section
112 second light transmitting section
113 first modulation section
114, 453, 460 second modulation section
115, 215, 452 control section
120, 321, 423, 451 light receiving apparatus
121 first light receiving section
122 second light receiving section
123 first demodulation section
124, 454 second demodulation section
125 data processing section
160 third light transmitting section
161 third light receiving section
162 external interface section
310 spreading code generating section
311 spreading section
313 transmission data modulator
320 inverse spreading section
421 first filter section
422 second filter section
455 oscillator
456, 458 clock generator
457, 461 transmission data modulator
459 demodulator
511 light modulation section
512 to 514 switch
515 electric power distributor
516 illumination section
517 communication section
600 illumination light communication apparatus

DETAILED DESCRIPTION OF THE INVENTION

Prior to the description of embodiments of the present invention, general characteristics of visible light communication and infrared communication will be briefly described now. First, as described above, visible light used for visible light communication has a characteristic of being used for illumination purpose in addition to usage for data communication. Further, in general, fluorescent lamps, white LEDs, and the like are used as light sources which emit visible light used for illumination purpose. Fluorescent lamps and white LEDs have a characteristic of having a low modulating speed (unsuitable for high-speed communication) as compared with light sources such as LEDs and semiconductor lasers for infrared communication, and the like. On the other hand, infrared light used for infrared communication is not used for illumination purpose because infrared light has invisible wavelengths. However, light sources, such as LEDs and semiconductor lasers for infrared communication, and the like, which emit infrared light have a characteristic of having a high modulating speed (suitable for high-speed communication).

By the above characteristics, it is thought that when the illumination is on, significant increase of a communication speed is possible by simultaneously performing visible light communication and infrared communication which is capable of being performed at a high speed. However, because visible light used for visible light communication becomes background light which interferes with infrared communication, significant increase of a communication speed is generally impossible even by simultaneously performing visible light communication and infrared communication. However, in optical free space transmission systems according to embodiments of the present invention which will be described below, significant increase of a communication speed is generally possible by simultaneously performing visible light communication and infrared communication when the illumination is on.

First Embodiment

FIG. 1 is a view showing an exemplary configuration of an optical free space transmission system 100 according to a first embodiment of the present invention. As shown in FIG. 1, the optical free space transmission system 100 includes a light transmitting apparatus 110 and a light receiving apparatus 120. The light transmitting apparatus 110 includes a control section 115, a first modulation section 113, a second modulation section 114, a first light transmitting section 111, and a second light transmitting section 112. The light receiving apparatus 120 includes a first light receiving section 121, a second light receiving section 122, a first demodulation section 123, a second demodulation section 124, and a data processing section 125.

FIG. 2 is a view showing the waveform of a modulation signal for visible light outputted by the first modulation section 113 and the waveform of a modulation signal for infrared light outputted by the second modulation section 114. As an example, FIG. 2 shows the waveforms in the case where the first modulation section 113 performs binary digital modulation and the second modulation section 114 performs binary digital modulation or 4-level digital modulation. The following will describe the operation of the optical free space transmission system 100 with reference to FIGS. 1 and 2.

First, the operation of the light transmitting apparatus 110 will be described. Data (hereinafter, referred to as transmission data) to be transmitted from the light transmitting apparatus 110 to the light receiving apparatus 120 is inputted to the control section 115. Next, the control section 115 separates data included in the transmission data into data not requiring high-speed communication (hereinafter, referred to as low-speed data) and data requiring high-speed communication (hereinafter, referred to as high-speed data). The criterion for the control section 115 to separate the transmission data is not limited thereto, and the control section 115 may separate the transmission data based on another criterion. Next, the control section 115 outputs the low-speed data to the first modulation section 113 for communication using visible light, and outputs the high-speed data to the second modulation section 114 for communication using infrared light. Next, as shown in the upper portion of FIG. 2, the first modulation section 113 performs the binary digital modulation of the low-speed data. On the other hand, as shown in the lower portion of FIG. 2, the second modulation section 114 performs the binary digital modulation or the 4-level digital modulation of the high-speed data. Here, as shown in FIG. 2, the control section 115 controls the second modulation section 114 such that the second modulation section 114 performs the 4-level digital modulation in synchronization with a period when a binary digital modulation signal resulting from the modulation by the first modulation section 113 is indicative of "0". Similarly, the control section 115 controls the second modulation section 114 such that the second modulation section 114 performs the binary digital modulation in synchronization with a period when the binary digital modulation signal resulting from the modulation by the first modulation section 113 is indicative of "1". Thus, as shown in FIG. 2, the waveform of the modulation signal for visible light outputted by the first modulation section 113 is synchronized with the waveform of the modulation signal for infrared light outputted by the second modulation section 114. Next, the first light transmitting section 111 performs conversion (hereinafter, referred to as electric-to-light conversion) of an electric signal (the modulation signal for visible light), which is inputted from the first modulation section 113, into a light signal of visible light (hereinafter, referred to as a visible light signal), and transmits the visible light signal to the space. At the same time, the second light transmitting section 112 performs electric-to-light conversion of an electric signal (the modulation signal for infrared light), which is inputted from the second modulation section 114, into a light signal of infrared light (hereinafter, referred to as an infrared light signal), and transmits the infrared light signal to the space. At this event, the first light transmitting section 111 and the second light transmitting section 112 perform electric-to-light conversion while maintaining the synchronization of the modulation signal for visible light and the modulation signal for infrared light, and transmits the visible light signal and the infrared light signal, respectively.

Here, as shown in the upper portion of FIG. 2, during the period when the binary digital modulation signal which is the modulation signal for visible light is indicative of "1", visible light to be emitted by the first light transmitting section 111 is turned on to be in an emitted state (hereinafter, referred to as "ON"). In addition, during the period when the binary digital modulation signal which is the modulation signal for visible light is indicative of "0", the visible light to be emitted by the first light transmitting section 111 is turned off to be in a quenched state (hereinafter, referred to as "OFF"). Thus, the visible light signal is transmitted from the light transmitting apparatus 110 to the light receiving apparatus 120. Further, as shown in the lower portion of FIG. 2, during a period of performing the 4-level digital modulation for the modulation signal for infrared light, the infrared light signal is transmitted to the light receiving apparatus 120 by being emitted with four-level intensity. During a period of performing the binary digital modulation for the modulation signal for infrared light, the infrared light signal is transmitted to the light receiving apparatus 120 by being emitted with two-level intensity.

By the above operations, under the control of the control section 115, the light transmitting apparatus 110 transmits the infrared light signal, which has been subjected to the binary digital modulation, during the period when the visible light for performing visible light communication is ON, and transmits the infrared light signal, which has been subjected to the 4-level digital modulation having a higher data transmission rate than the binary digital modulation performed during the period when the visible light is ON, during the period when the visible light for performing visible light communication is OFF.

The following will describe the operation of the light receiving apparatus 120. The first light receiving section 121 receives the visible light signal, and performs conversion (hereinafter, referred to as light-to-electric conversion) of the light signal into an electric signal. Next, the first demodulation section 123 demodulates the electric signal (the modulation signal for visible light) resulting from the light-to-electric conversion, to obtain the low-speed data. On the other hand, the second light receiving section 122 receives the infrared light signal, and performs light-to-electric conversion of the infrared light signal. Next, the second demodulation section 124 demodulates the electric signal (the modulation signal for infrared light) resulting from the light-to-electric conversion, to obtain the high-speed data. Next, the data processing section 125 combines the low-speed data and the high-speed data to reconstruct the transmission data.

As described above, during the period when the visible light for performing visible light communication is ON, the optical free space transmission system 100 transmits an infrared light signal using a modulation scheme which uses a small number of levels and by which communication is capable of being performed even when a signal-to-noise ratio (hereinafter, referred to as an SNR) is small (a standard modulation scheme which has a low data transmission rate but high noise tolerance; e.g. the aforementioned binary digital modulation scheme). On the other hand, during the period when the visible light for performing visible light communication is OFF, the optical free space transmission system 100 transmits an infrared light signal using a modulation scheme which uses a large number of levels and by which communication is not capable of being performed when an SNR is small (a high-speed modulation scheme which has a high data transmission rate but low noise tolerance; e.g. the aforementioned 4-level digital modulation scheme).

Thus, the optical free space transmission system 100 transmits an infrared light signal using a modulation scheme, which is insusceptible to visible light, during the period when the visible light which is the background light which interferes with infrared communication is ON, and transmits an infrared light signal using a modulation scheme, which uses a large number of levels and by which high-speed communication is capable of being performed, during the period when the visible light which is the background light which interferes with infrared communication is OFF. As a result, because the optical free space transmission system 100 is capable of performing infrared communication at a high speed in parallel with visible light communication when the illumination is ON, the optical free space transmission system 100 can achieve significant increase of a communication speed.

Second Embodiment

Figure 4:
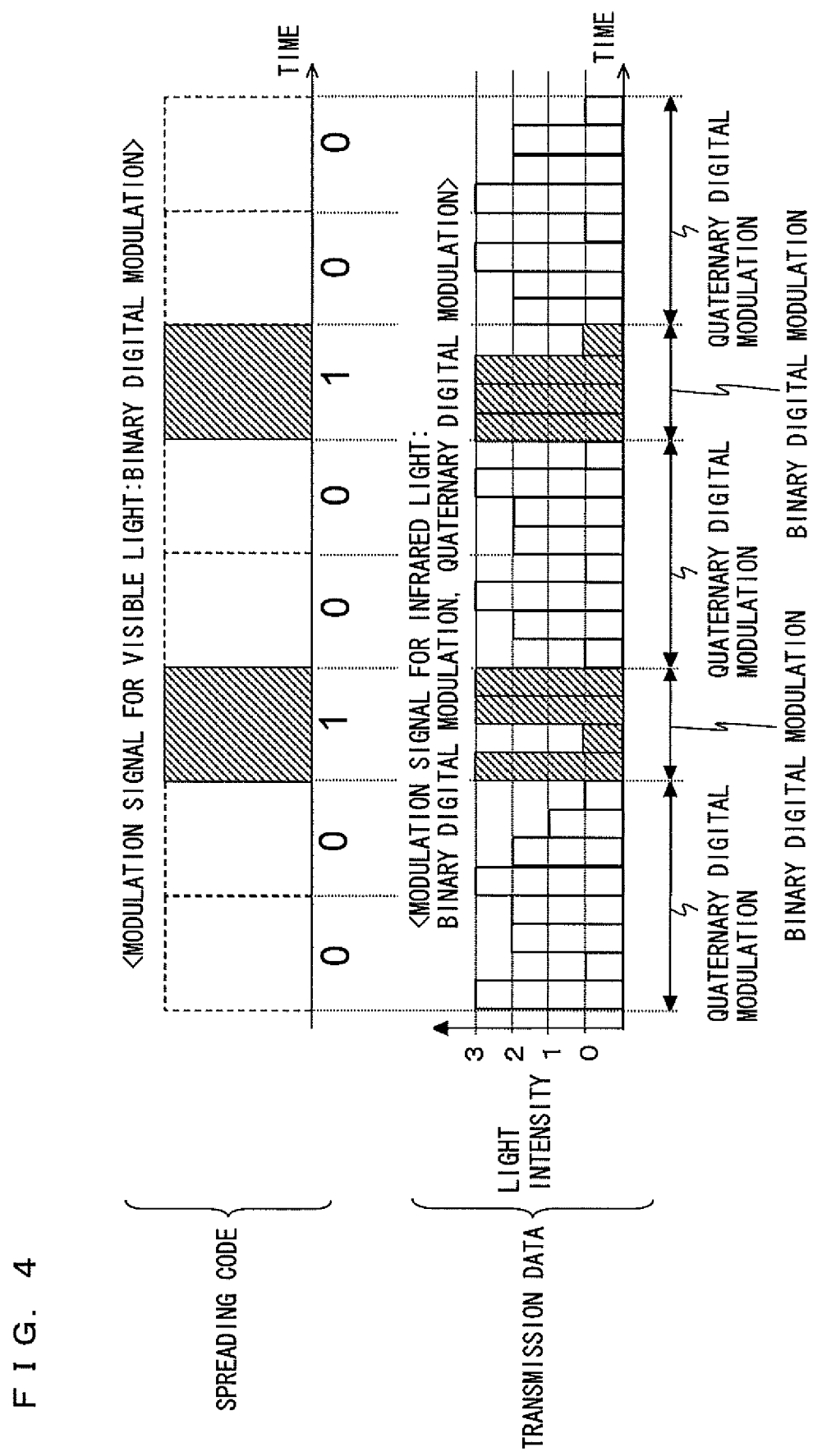
FIG. 4 is a view showing the waveform of a modulation signal for visible light outputted by a first modulation section 113 of the optical free space transmission system 200 and the waveform of a modulation signal for infrared light outputted by a second modulation section 114 of the optical free space transmission system 200.

FIG. 3 is a view showing an exemplary configuration of an optical free space transmission system 200 according to a second embodiment of the present invention. As shown in FIG. 3, the optical free space transmission system 200 includes a light transmitting apparatus 312 and a light receiving apparatus 321. The light transmitting apparatus 312 differs from the light transmitting apparatus 110 (see FIG. 1) of the optical free space transmission system 100 of the first embodiment in including a control section 215 instead of the control section 115, and in further including a spreading code generating section 310. Further, a second modulation section 114 of the light transmitting apparatus 312 includes a transmission data modulator 313 and a spreading section 311. The light receiving apparatus 321 differs from the light receiving apparatus 120 of the optical free space transmission system 100 in further including an inverse spreading section 320, and in not including the data processing section 125. In the optical free space transmission system 200 in FIG. 3, the same elements as those of the optical free space transmission system 100 in FIG. 1 are designated by the same reference characters, and the detailed description thereof will be omitted. FIG. 4 is a view showing the waveform of a modulation signal for visible light outputted by a first modulation section 113 and the waveform of a modulation signal for infrared light outputted by the second modulation section 114. Similarly as FIG. 2 described in the first embodiment, as an example, FIG. 4 shows the waveforms in the case where the first modulation section 113 performs binary digital modulation and the second modulation section 114 performs binary digital modulation or 4-level digital modulation. The following will describe the operation of the optical free space transmission system 200 with reference to FIGS. 3 and 4.

First, the operation of the light transmitting apparatus 312 will be described. The spreading code generating section 310 generates a spreading code, and outputs the spreading code to the control section 215, the first modulation section 113, and the spreading section 311. Next, the first modulation section 113 performs the binary digital modulation of the inputted spreading code (see the upper portion of FIG. 4). On the other hand, the control section 215 receives transmission data from the outside of the light transmitting apparatus 312, and outputs the transmission data to the second modulation section 114. The transmission data modulator 313 of the second modulation section 114 performs the binary digital modulation and the 4-level digital modulation of the transmission data (see the lower portion of FIG. 4). Here, as shown in FIG. 4, the control section 215 controls the second modulation section 114 based on the spreading code inputted from the spreading code generating section 310 such that the second modulation section 114 (the transmission data modulator 313) performs the 4-level digital modulation in synchronization with a period when a binary digital modulation signal resulting from the modulation by the first modulation section 113 is indicative of "0". Similarly, the control section 215 controls the second modulation section 114 based on the spreading code inputted from the spreading code generating section 310 such that the second modulation section 114 (the transmission data modulator 313) performs the binary digital modulation in synchronization with a period when the binary digital modulation signal resulting from the modulation by the first modulation section 113 is indicative of "1". Thus, as shown in FIG. 4, the modulation signal for visible light (the binary digital modulation signal) outputted by the first modulation section 113 is synchronized with the modulation signal for infrared light (the binary digital modulation or 4-level digital modulation signal) outputted by the transmission data modulator 313. Next, the spreading section 311 spreads the modulation signal for infrared light by using the spreading code inputted from the spreading code generating section 310. Next, the first light transmitting section 111 performs electric-to-light conversion of the modulation signal for visible light into a visible light signal, and transmits the visible light signal to the space. At the same time, the second light transmitting section 112 performs electric-to-light conversion of the spread modulation signal for infrared light into an infrared light signal, and transmits the infrared light signal to the space. At this event, the first light transmitting section 111 and the second light transmitting section 112 perform electric-to-light conversion while maintaining the synchronization of the modulation signal for visible light and the modulation signal for infrared light as described above, and transmits the visible light signal and the infrared light signal, respectively.

By the above operations, under the control of the control section 115, the light transmitting apparatus 312 transmits the infrared light signal resulting from the binary digital modulation during a period when the visible light for performing visible light communication is ON, and transmits the infrared light signal resulting from the 4-level digital modulation, which has a higher data transmission rate than the binary digital modulation performed during the period when the visible light is ON, during a period when the visible light for performing visible light communication is OFF.

The following will describe the operation of the light receiving apparatus 321. The first demodulation section 123 demodulates an electric signal (the modulation signal for visible light) obtained by the first light receiving section 121 receiving the visible light signal, to obtain the spreading code. On the other hand, the inverse spreading section 320 receives an electric signal (the spread electric signal for infrared light) obtained by the second light receiving section 122 receiving the infrared light signal, and then inverse-spreads the electric signal by using the spreading code obtained by the first demodulation section 123. Thus, the inverse spreading section 320 obtains the modulation signal for infrared light. Next, the second demodulation section 124 demodulates the modulation signal for infrared light to reconstruct the transmission data.

As described above, similarly as the optical free space transmission system 100 of the first embodiment, the optical free space transmission system 200 enables high-speed communication even when the illumination is on, by switching a modulation scheme for infrared communication in synchronization with the ON/OFF period of the visible light. Further, in the optical free space transmission system 200, because communication of transmission data is performed using a spreading process, spreading gain regarding the modulation signal for infrared light is obtained. Thus, because noise tolerance of infrared communication increases by the obtained spreading gain, a modulation scheme (by which communication is capable of being performed at a higher speed) requiring a higher SNR than the modulation scheme used for the infrared communication performed by the optical free space transmission system 100 of the first embodiment can be used as a modulation scheme used for the infrared communication performed by the optical free space transmission system 200. As a result, the optical free space transmission system 200 can achieve communication at a higher speed than the optical free space transmission system 100 of the first embodiment.

Third Embodiment

Figure 5:
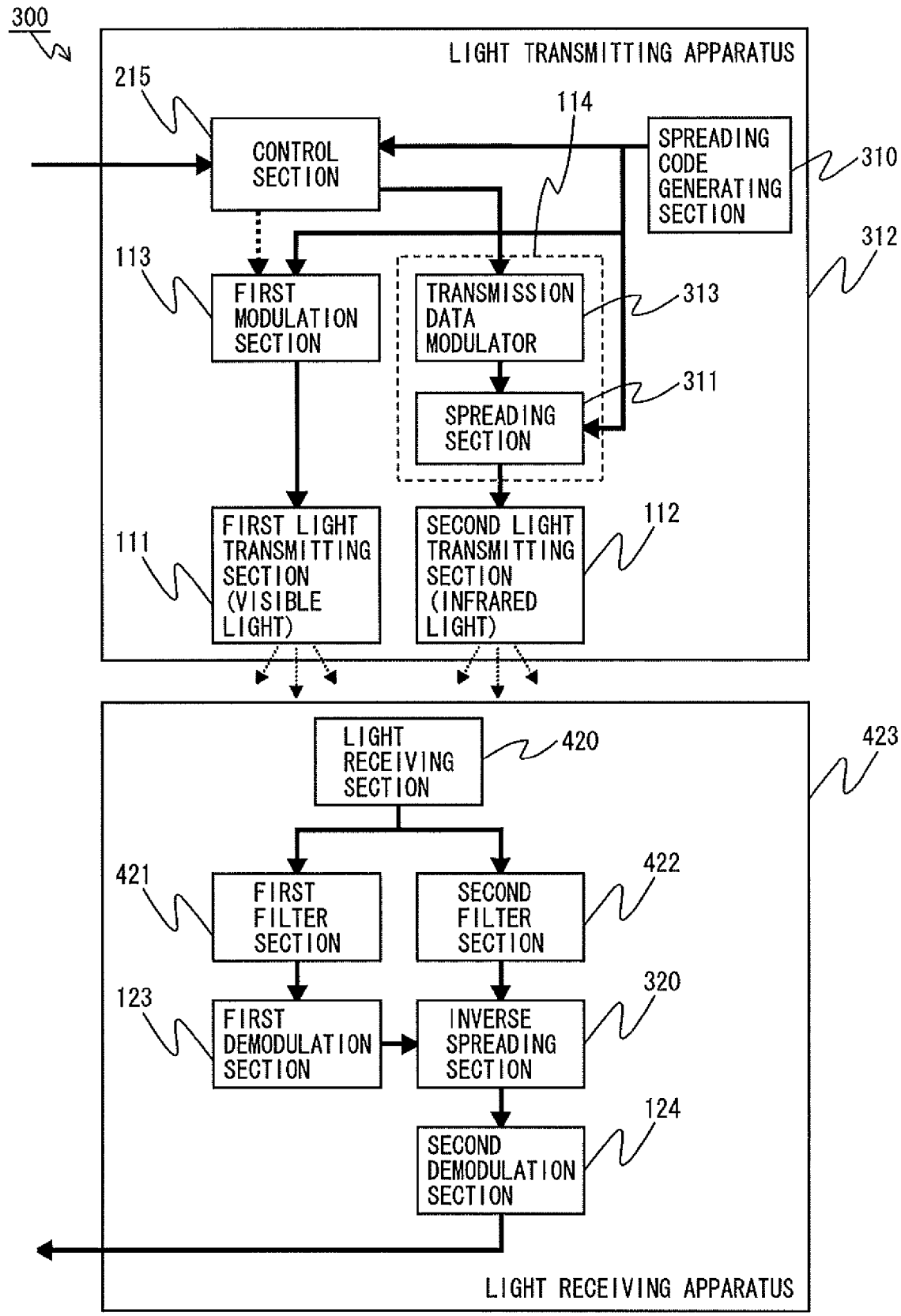
FIG. 5 is a view showing an exemplary configuration of an optical free space transmission system 300 according to a third embodiment of the present invention.

FIG. 5 is a view showing an exemplary configuration of an optical free space transmission system 300 according to a third embodiment of the present invention. As shown in FIG. 5, the optical free space transmission system 300 includes a light transmitting apparatus 312 and a light receiving apparatus 423. The light receiving apparatus 423 differs from the light receiving apparatus 321 (see FIG. 3) of the optical free space transmission system 200 of the second embodiment in including a light receiving section 420, a first filter section 421, and a second filter section 422 instead of the first light receiving section 121 and the second light receiving section 122. In the optical free space transmission system 300 in FIG. 5, the same elements as those of the optical free space transmission system 200 of the second embodiment are designated by the same reference characters, and the detailed description thereof will be omitted. The following will describe the operation of the optical free space transmission system 300 with reference to FIG. 5.

Figure 6:
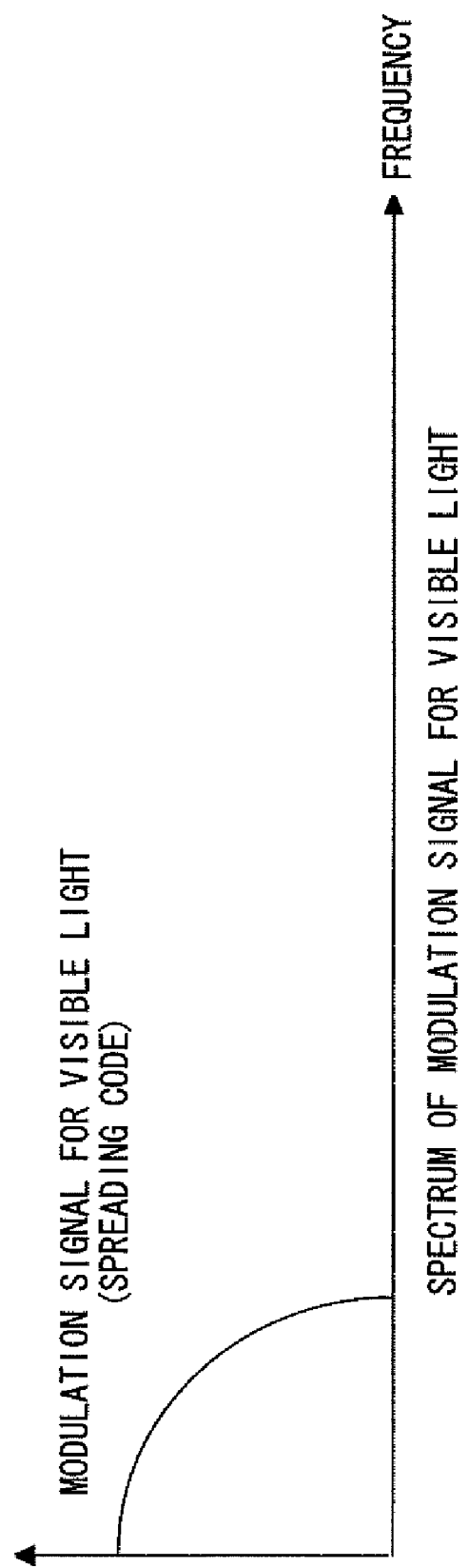
FIG. 6 is a view showing the spectrum of an electric signal (a modulation signal for visible light) outputted by a first modulation section 113 of the optical free space transmission system 300.
Figure 7:
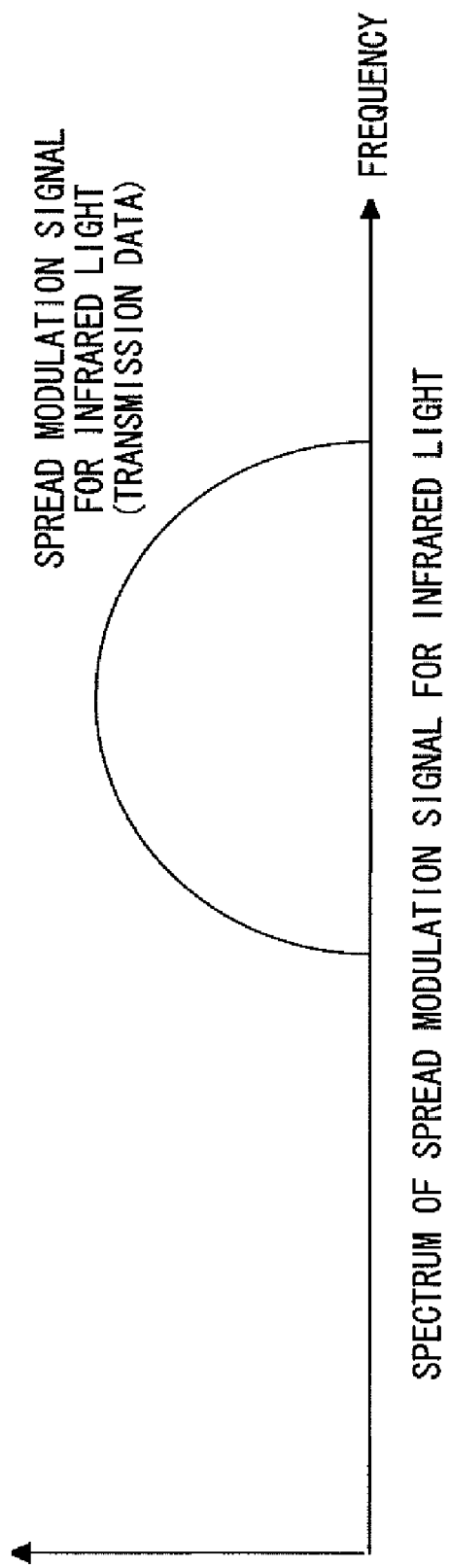
FIG. 7 is a view showing the spectrum of an electric signal (a spread modulation signal for infrared light) outputted by a spreading section 311 of the optical free space transmission system 300.

First, the operation of the light transmitting apparatus 312 will be described. The light transmitting apparatus 312 of the optical free space transmission system 300 slightly differs from the light transmitting apparatus 312 of the optical free space transmission system 200 in the operations of the first modulation section 113 and the second modulation section 114. The following will describe the operations of the first modulation section 113 and the second modulation section 114. FIG. 6 is a view showing the spectrum of an electric signal (a modulation signal for visible light) outputted by the first modulation section 113. FIG. 7 is a view showing the spectrum of an electric signal (a spread modulation signal for infrared light) outputted by a spreading section 311. As shown in FIG. 6, the first modulation section 113 performs modulation such that the spectrum of the outputted electric signal (the modulation signal for visible light) exists in a relatively low frequency band. On the other hand, as shown in FIG. 7, the second modulation section 114 performs modulation such that the spectrum of the electric signal (the spread modulation signal for infrared light) outputted by the spreading section 311 exists in a relatively high frequency band so as not to overlap with the spectrum of the modulation signal for visible light in FIG. 6. Regarding the operations other than the above, the same operations as those of the optical free space transmission system 200 of the second embodiment are performed, and the light transmitting apparatus 312 transmits a visible light signal and an infrared light signal to the light receiving apparatus 423.

Figure 8:
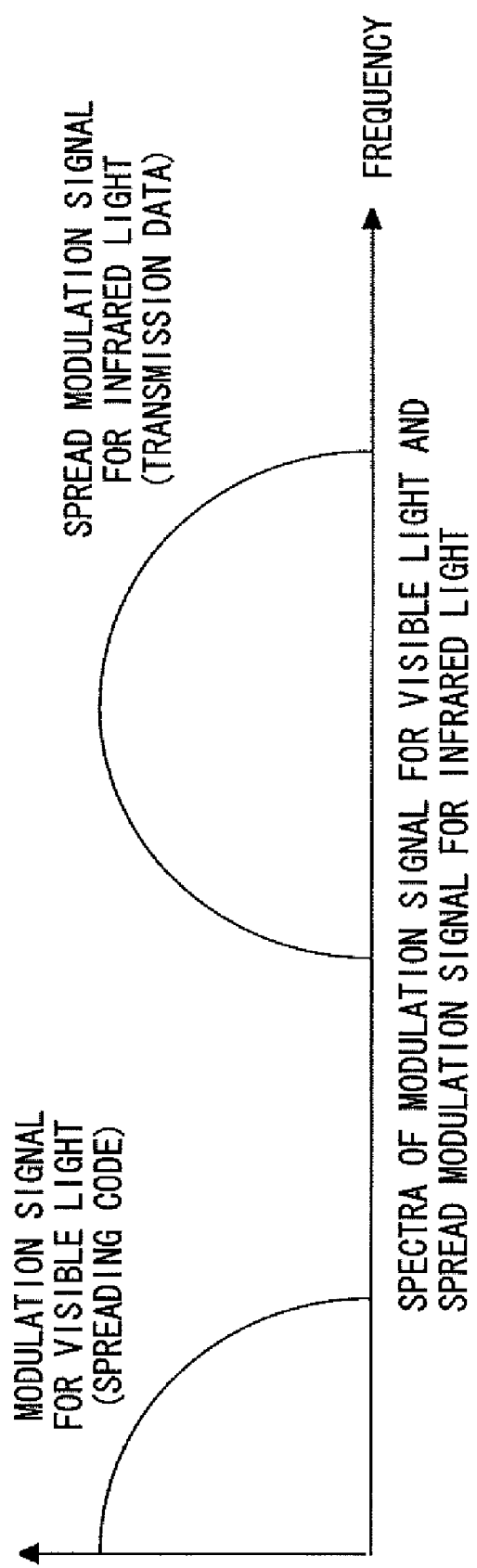
FIG. 8 is a view showing the spectra of electric signals (a modulation signal for visible light and a spread modulation signal for infrared light) outputted by a light receiving section 420 of the optical free space transmission system 300.

The following will describe the operation of the light receiving apparatus 423. The light receiving section 420 receives the visible light signal and the infrared light signal, and performs light-to-electric conversion. FIG. 8 is a view showing the spectra of electric signals (the modulation signal for visible light and the spread modulation signal for infrared light) outputted by the light receiving section 420. Here, as shown in FIG. 8, regarding the electric signals outputted by the light receiving section 420, the frequency band in which the spectrum of the modulation signal for visible light exists is different from that in which the spread modulation signal for infrared light exists. Next, the first filter section 421 receives the electric signals (the modulation signal for visible light and the spread modulation signal for infrared light) outputted by the light receiving section 420, and extracts the modulation signal for visible light which exists in the low frequency band. On the other hand, the second filter section 422 receives the electric signals outputted by the light receiving section 420, and extracts the spread modulation signal for infrared light which exists in the high frequency band. Regarding the operations other than the above, the same operations as those of the light receiving apparatus 321 of the optical free space transmission system 200 of the second embodiment are performed, and the light receiving apparatus 423 reconstructs the transmission data inputted to the light transmitting apparatus 312.

As described above, similarly as the optical free space transmission system 200 of the second embodiment, the optical free space transmission system 300 performs communication of transmission data using a spreading process, thereby enabling communication at a higher speed than the optical free space transmission system 100 of the first embodiment. In addition, in the optical free space transmission system 300, the light transmitting apparatus 312 performs electric-to-light conversion of the modulation signal for visible light and the spread modulation signal for infrared light which have electrically different frequency bands, and transmits light signals. Thus, in the optical free space transmission system 300, the light receiving apparatus 423 is capable of separating the modulation signal for visible light and the spread modulation signal for infrared light by using the filters after receiving the light signals. As a result, the optical free space transmission system 300 is capable of receiving light signals by using one light receiving section, unlike the optical free space transmission system 200 of the second embodiment.

Fourth Embodiment

Although the following description is omitted for the optical free space transmission system 100 in the first embodiment, the second modulation section 114 of the light transmitting apparatus 110 performs modulation by using a clock signal, and the second demodulation section 124 of the light receiving apparatus 120 also performs modulation by using a clock signal. Then, in the optical free space transmission system 100, the second modulation section 114 and the second demodulation section 124 individually generate clock signals, and perform modulation and demodulation, respectively. In the case where modulation and demodulation are performed by using clock signals individually generated on the transmitting side and the receiving side as described above, the possibility that a demodulation error occurs on the receiving side increases. This is because the slight difference between the frequency of the clock signal on the transmitting side and the frequency of the clock signal on the receiving side and the synchronization error of the clock signal and the received signal on the receiving side upon demodulation increase an error rate of signal determination upon the demodulation. In the optical free space transmission system 100, this possibility of the demodulation error increases more when an infrared light signal is transmitted during a period of emitting the visible light, which is a problem. This is because the visible light acts as interference light for the infrared light signal as described above. It is noted that in the optical free space transmission system 100, the clock signals may be generated outside or inside the light transmitting apparatus 110 and the light receiving apparatus 120, or inside the second modulation section 114 and the second demodulation section 124. Hereinafter, for convenience of explanation, a clock signal in the optical free space transmission system 100 is generated by an oscillator and a clock generator (not shown in FIG. 1) of each of the second modulation section 114 and the second demodulation section 124.

Figure 9:
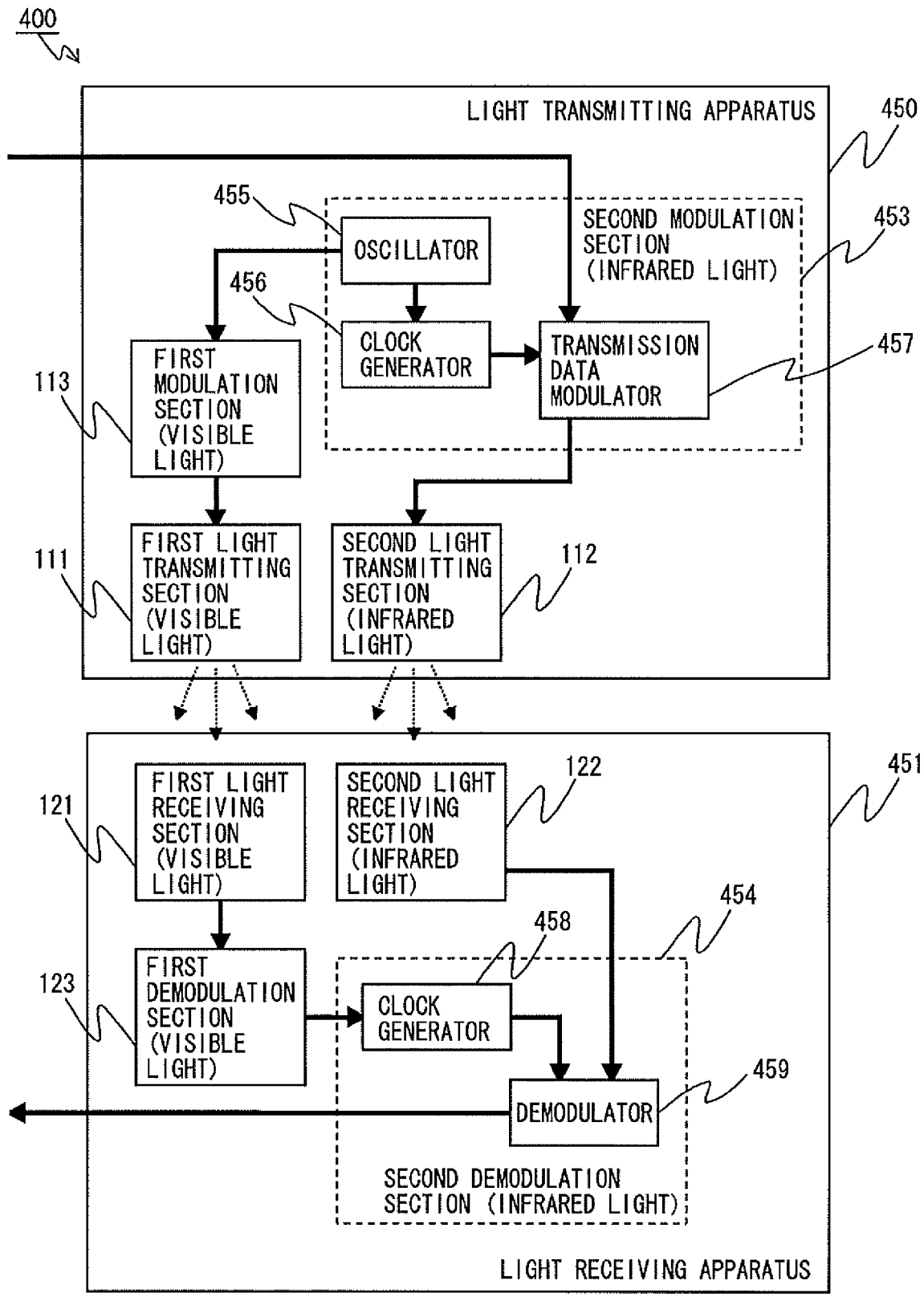
FIG. 9 is a view showing an exemplary configuration of an optical free space transmission system 400 according to a fourth embodiment of the present invention.

An optical free space transmission system 400 according to a fourth embodiment transmits transmission data using infrared light while transmitting information (a reference frequency signal) regarding a clock signal on the transmitting side using visible light. Thus, the optical free space transmission system 400 reduces the above error rate of signal determination upon demodulation, and enables high-speed communication when the illumination is on FIG. 9 is a view showing an exemplary configuration of the optical free space transmission system 400 according to the fourth embodiment of the present invention. As shown in FIG. 9, the optical free space transmission system 400 includes a light transmitting apparatus 450 and a light receiving apparatus 451. The light transmitting apparatus 450 differs from the light transmitting apparatus 110 (see FIG. 1) of the optical free space transmission system 100 of the first embodiment in including a second modulation section 453 instead of the second modulation section 114, and in not including the control section 115. The light receiving apparatus 451 differs from the light receiving apparatus 120 (see FIG. 1) of the optical free space transmission system 100 of the first embodiment in including a second demodulation section 454 instead of the second demodulation section 124, and in not including the data processing section 125. Similarly as the second modulation section 114 of the light transmitting apparatus 110, the second modulation section 453 includes an oscillator 455, a clock generator 456, and a transmission data modulator 457. The second demodulation section 454 includes a clock generator 458 and a demodulator 459 similarly as the second demodulation section 124, but does not include an oscillator unlike the clock generator second demodulation section 124. Because the description regarding the clock signals is omitted in the first embodiment, the oscillator and the like which are internal devices of each of the second modulation section 114 and the second demodulation section 124 are not shown in FIG. 1. Further, in the optical free space transmission system 400, the same elements as those of the optical free space transmission system 100 of the first embodiment are designated by the same reference characters, and the detailed description thereof will be omitted.

Figure 10:
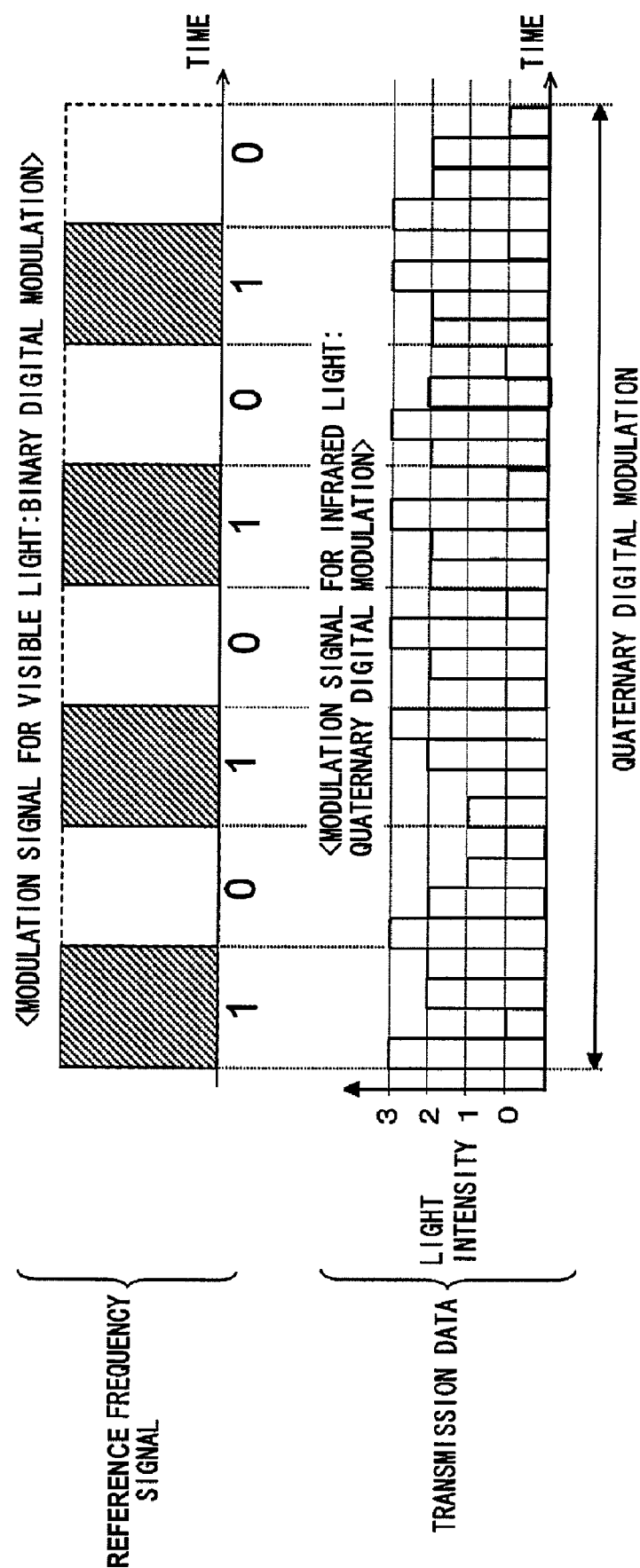
FIG. 10 is a view showing the waveform of a modulation signal for visible light outputted by a first modulation section 113 of the optical free space transmission system 400 and the waveform of a modulation signal for infrared light outputted by a second modulation section 453 of the optical free space transmission system 400.

FIG. 10 is a view showing the waveform of a modulation signal for visible light outputted by a first modulation section 113 of the optical free space transmission system 400 and the waveform of a modulation signal for infrared light outputted by the second modulation section 453 of the optical free space transmission system 400. As an example, FIG. 10 shows the waveforms in the case where the first modulation section 113 performs binary digital modulation and the second modulation section 453 performs 4-level digital modulation. The following will describe the operation of the optical free space transmission system 400 with reference to FIGS. 9 and 10.

First, the operation of the light transmitting apparatus 450 will be described. Transmission data is inputted to the transmission data modulator 457 of the second modulation section 453. The oscillator 455 generates a signal (hereinafter, referred to as a reference frequency signal) having a predetermined reference frequency, and outputs the reference frequency signal to the first modulation section 113 and the clock generator 456. The first modulation section 113 demodulates the reference frequency signal to generate the modulation signal for visible light (see the upper portion of FIG. 10), and outputs the modulation signal to the first light transmitting section 111. The first light transmitting section 111 performs electric-to-light conversion of the output signal of the first modulation section 113, and emits a visible light signal. On the other hand, the clock generator 456 increases the frequency of the reference frequency signal (increases the speed) to generate a clock signal, and outputs the clock signal to the transmission data modulator 457. The transmission data modulator 457 performs digital modulation of the transmission data by using the clock signal inputted from the clock generator 456 to generate the modulation signal for infrared light (see the lower portion of FIG. 10), and outputs the modulation signal to the second light transmitting section 112. The second light transmitting section 112 performs electric-to-light conversion of the output signal of the second modulation section 453, and emits an infrared light signal.

By the above operation, the light transmitting apparatus 450 transmits the reference frequency signal, which is a relatively low speed signal used for generating a clock signal, to the light receiving apparatus 451 by using visible light, and transmits the transmission data, which have been subjected to high-speed modulation by using the clock signal, to the light receiving apparatus 451 by using infrared light.

The following will describe the operation of the light receiving apparatus 451. The first light receiving section 121 receives the visible light signal, and performs light-to-electric conversion. Next, the first demodulation section 123 demodulates the electric signal (the modulation signal for visible light) which has been subjected to the light-to-electric conversion, to obtain the reference frequency signal, and outputs the reference frequency signal to the clock generator 458 of the second demodulation section 454. On the other hand, the second light receiving section 122 receives the infrared light signal, performs light-to-electric conversion, and outputs the resultant electric signal to the demodulator 459 of the second demodulation section 454. Next, the clock generator 458 of the second demodulation section 454 increases the frequency of the inputted reference frequency signal (increases the speed) to generate a clock signal, and outputs the clock signal to the demodulator 459. The demodulator 459 demodulates the modulation signal for infrared light, which is inputted from the second light receiving section 122, by using the clock signal inputted from the clock generator 458 to reconstruct the transmission data. Here, the entire optical free space transmission system 400 is adjusted such that the modulation signal for infrared light and the clock signal are inputted to the demodulator 459 so as to be synchronized with each other.

As described above, in the optical free space transmission system 400, the reference frequency signal used for generating a clock signal used for modulation of transmission data on the transmitting side is transmitted to the receiving side, and the receiving side generates a clock signal by using the received reference frequency signal and demodulates the transmission data by using the clock signal. Thus, the optical free space transmission system 400 can eliminate the slight difference between the frequency of the clock signal on the transmitting side and the frequency of the clock signal on the receiving side, and can perform accurate signal determination upon demodulation by the synchronization error of the clock signal and the received signal on the receiving side upon the demodulation, thereby reducing the error rate of signal determination. Therefore, during a period when the visible light which is the background light which interferes with infrared communication is not only OFF but also ON, the optical free space transmission system 400 is capable of transmitting an infrared light signal using a modulation scheme by which high-speed communication is capable of being performed and which uses a large number of levels. As a result, because the optical free space transmission system 400 is capable of performing infrared communication at a high speed in parallel with visible light communication even when the illumination is on, the optical free space transmission system 400 can achieve significant increase of a communication speed.

Fifth Embodiment

A fifth embodiment will describe an optical free space transmission system 500 in which a function of: transmitting an infrared light signal using a standard modulation scheme, which has a low data transmission rate but high noise tolerance, during a period when the visible light for performing visible light communication is ON; and transmitting an infrared light signal using a high-speed modulation scheme, which has a high data transmission rate but low noise tolerance, during a period when the visible light for performing visible light communication is OFF, is added to the optical free space transmission system 400 of the fourth embodiment similarly as in the first embodiment.

Figure 11:
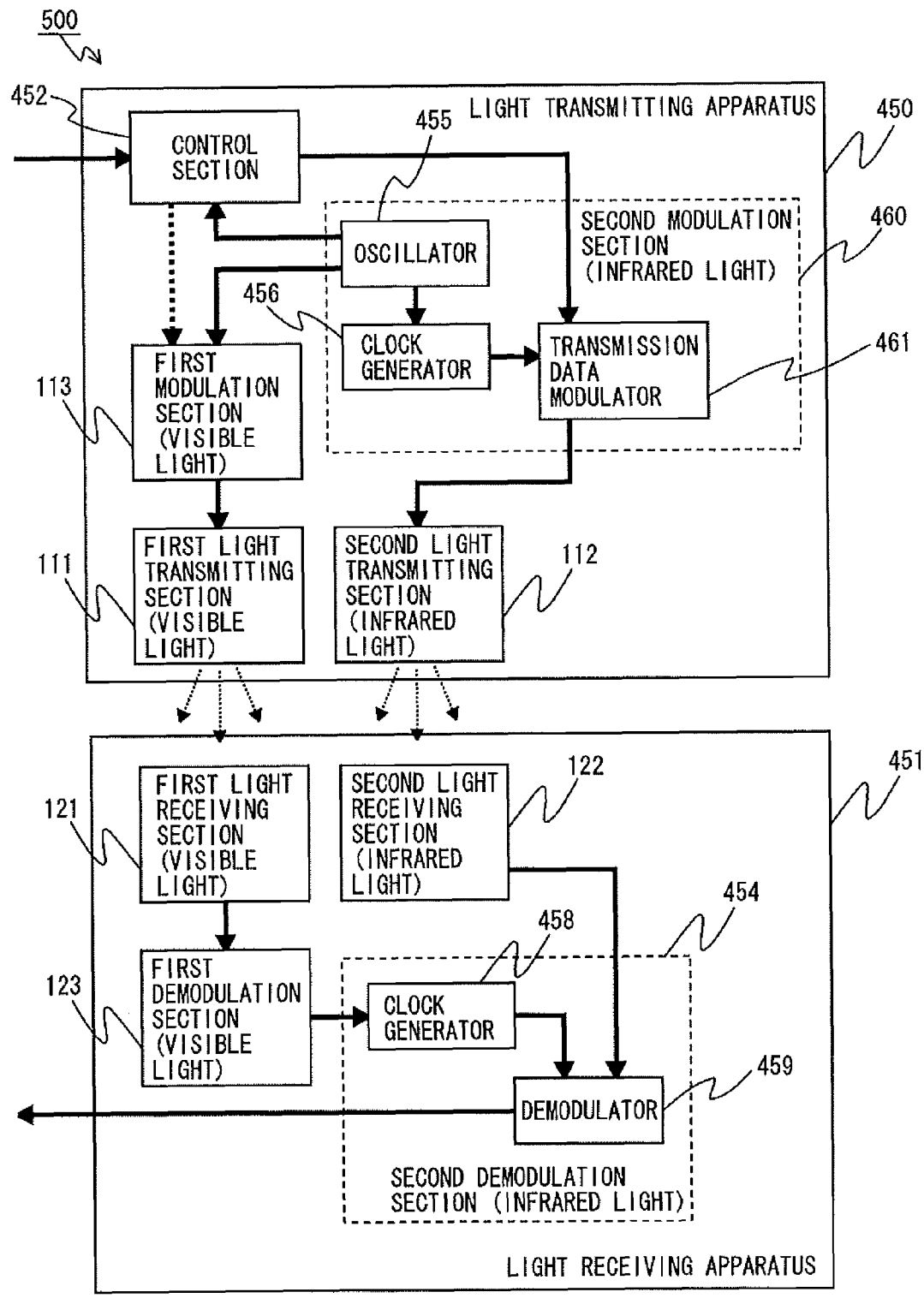
FIG. 11 is a view showing an exemplary configuration of an optical free space transmission system 500 according to a fifth embodiment of the present invention.

FIG. 11 is a view showing an exemplary configuration of the optical free space transmission system 500 according to the fifth embodiment of the present invention. The optical free space transmission system 500 differs from the optical free space transmission system 400 (see FIG. 9) of the fourth embodiment in including a second modulation section 460 instead of the second modulation section 453, and in further including a control section 452. The second modulation section 460 differs from the second modulation section 453 in including a transmission data modulator 461 instead of the transmission data modulator 457. In the optical free space transmission system 500, the same elements as those of the optical free space transmission system 400 of the fourth embodiment are designated by the same reference characters, and the detailed description thereof will be omitted.

Figure 12:
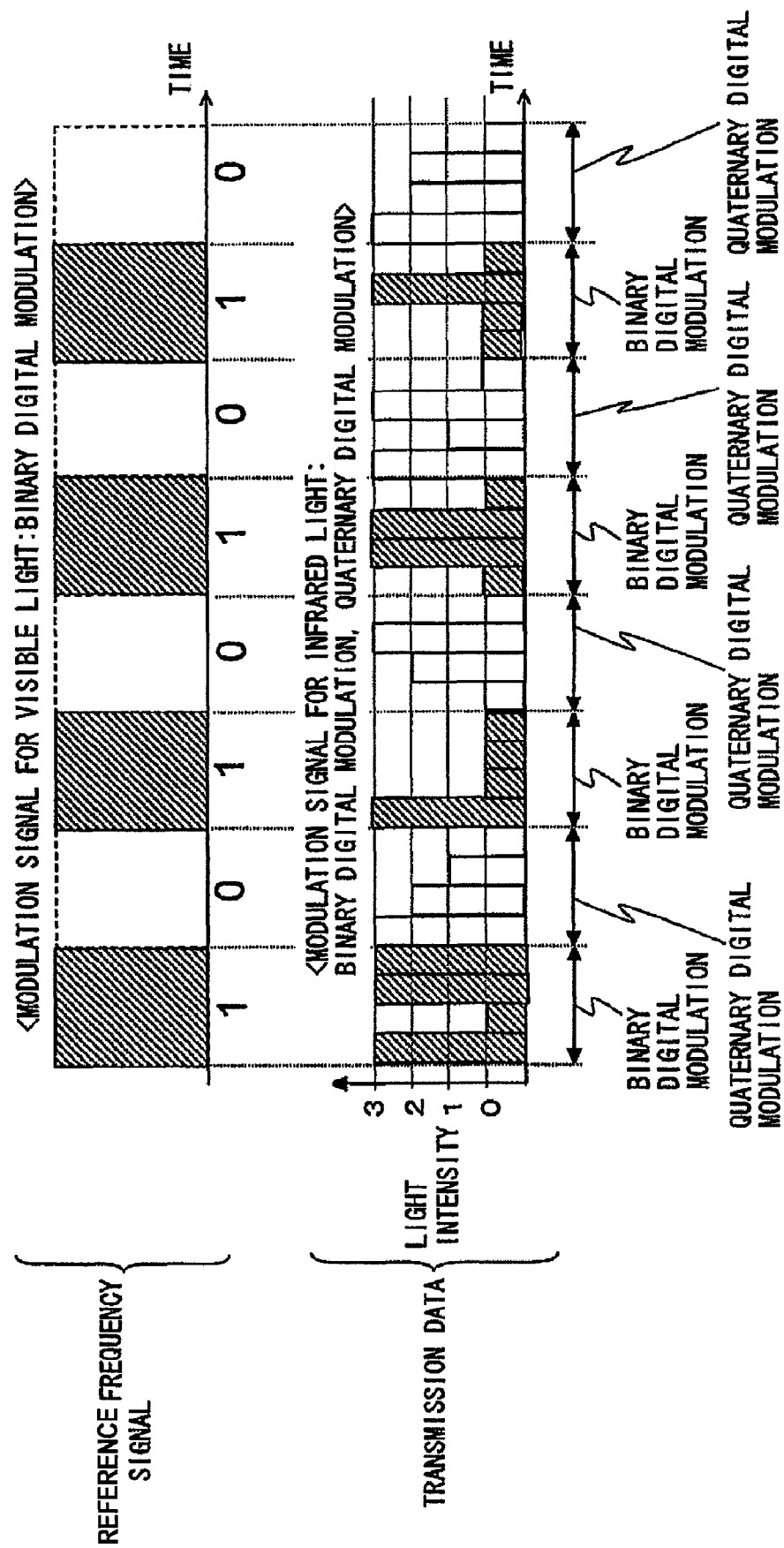
FIG. 12 is a view showing the waveform of a modulation signal for visible light outputted by a first modulation section 113 of the optical free space transmission system 500 and the waveform of a modulation signal for infrared light outputted by a second modulation section 460 of the optical free space transmission system 500.

FIG. 12 is a view showing the waveform of a modulation signal for visible light outputted by a first modulation section 113 of the optical free space transmission system 500 and the waveform of a modulation signal for infrared light outputted by the second modulation section 460 of the optical free space transmission system 500. As an example, FIG. 12 shows the waveforms in the case where the first modulation section 113 performs binary digital modulation and the second modulation section 460 performs binary digital modulation or 4-level digital modulation. The following will describe the operation of the optical free space transmission system 500 with reference to FIGS. 11 and 12.

The control section 452 receives transmission data from the outside of the light transmitting apparatus 450, and outputs the transmission data to the transmission data modulator 461 of the second modulation section 460. Similarly as in the first embodiment (see FIG. 2), the transmission data modulator 461 performs the binary digital modulation or the 4-level digital modulation of the transmission data as shown in the lower portion of FIG. 12. Further, the control section 452 receives a reference frequency signal from an oscillator 455. Then, similarly as in the first embodiment, as shown in FIG. 12, the control section 452 controls the transmission data modulator 461 such that the transmission data modulator 461 performs the 4-level digital modulation in synchronization with a period when a binary digital modulation signal resulting from the modulation by the first modulation section 113 is indicative of "0". Similarly, the control section 452 controls the transmission data modulator 461 such that the transmission data modulator 461 performs the binary digital modulation in synchronization with a period when the binary digital modulation signal resulting from the modulation by the first modulation section 113 is indicative of "1". Thus, as shown in FIG. 12, the waveform of the modulation signal for visible light outputted by the first modulation section 113 is synchronized with the waveform of the modulation signal for infrared light outputted by the second modulation section 460. Further, similarly as in the first embodiment, as described above, the first light transmitting section 111 and the second light transmitting section 112 perform electric-to-light conversion while maintaining the synchronization of the modulation signal for visible light and the modulation signal for infrared light, and transmit a visible light signal and an infrared light signal, respectively.

According to the optical free space transmission system 500 of the above fifth embodiment, similarly as the optical free space transmission system 400 of the fourth embodiment, the slight difference between the frequency of a clock signal on the transmitting side and the frequency of a clock signal on the receiving side can be eliminated and accurate signal determination upon demodulation by the synchronization error of the clock signal and the received signal on the receiving side upon the demodulation can be performed, thereby reducing an error rate of signal determination. In addition, according to the optical free space transmission system 500, similarly as the optical free space transmission system 100 of the first embodiment, the error rate of signal determination upon demodulation can be reduced more by switching the modulation scheme for infrared light signal in accordance with ON/OFF of the visible light which becomes the interference light. As a result, the optical free space transmission system 500 of the fifth embodiment can ensure more stable high-speed communication.

Figure 13:
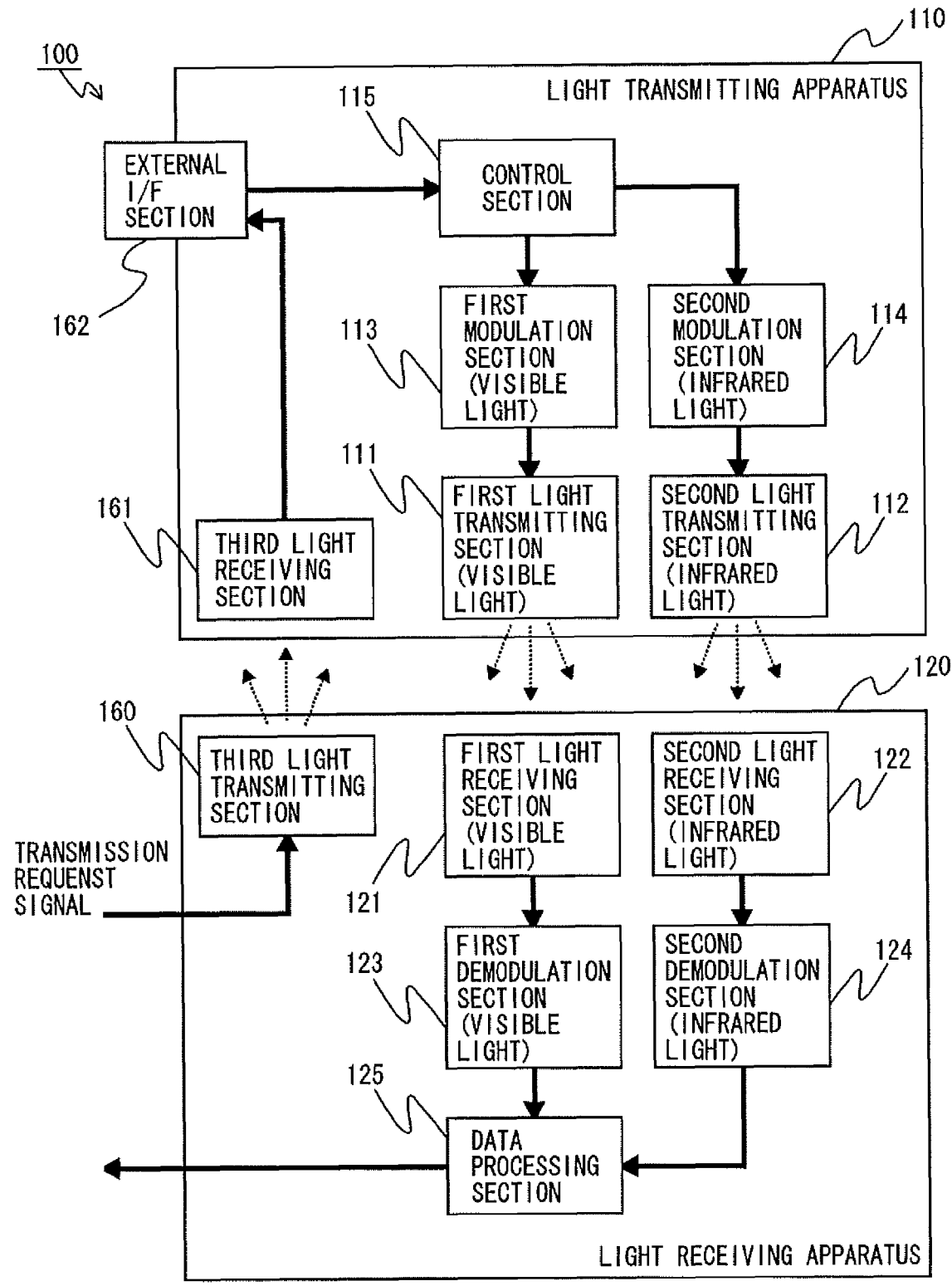
FIG. 13 is a view showing an exemplary configuration in which a function of transmitting a transmission request signal is added to the optical free space transmission system 100 of the first embodiment.
Figure 14:
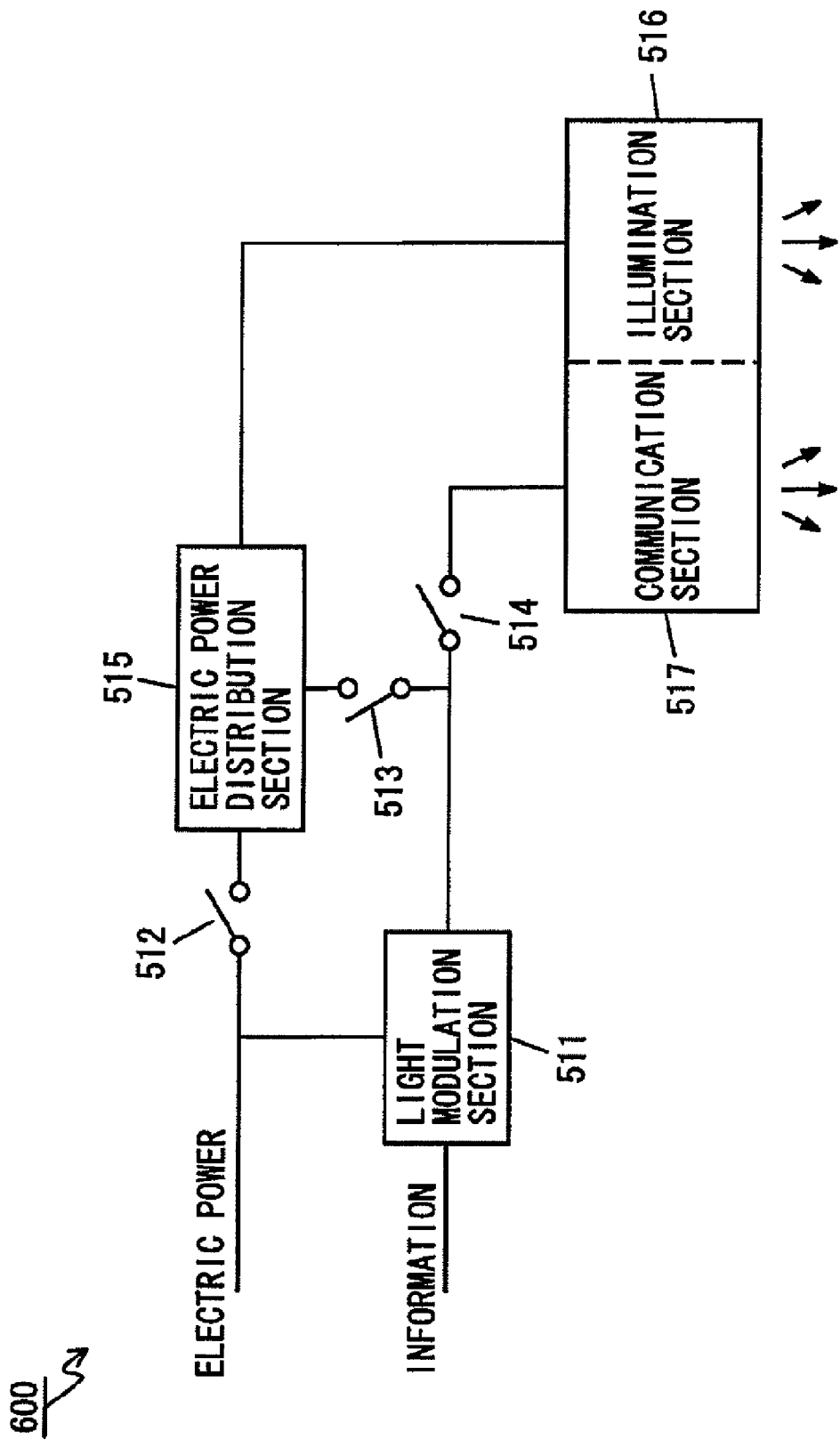
FIG. 14 is a view showing a configuration of an illumination light communication apparatus 600 in the Patent Document 1.

In the first to fifth embodiments described above, it may be configured that the light transmitting apparatus further includes a light receiving section, the light receiving apparatus further includes a light transmitting section, and a signal (hereinafter, referred to as a transmission request signal) which requests start of transmitting transmission data can be transmitted from the light receiving apparatus to the light transmitting apparatus. The following will give a simple description using the optical free space transmission system 100 of the first embodiment as an example. FIG. 13 is a showing an exemplary configuration in which a function of transmitting a transmission request signal is added to the optical free space transmission system 100 of the first embodiment. As shown in FIG. 13, the light transmitting apparatus 110 further includes a third light receiving section 161, and the light receiving apparatus 120 further includes a third light transmitting section 160. Here, although the following description is omitted in the first embodiment for convenience of explanation, an external interface section 162 connects an external apparatus (not shown) to the light transmitting apparatus 110 and inputs transmission data from the external apparatus to the control section 115. A transmission request signal is inputted to the third light transmitting section 160 by a user or the like, and the third light transmitting section 160 performs electric-to-light conversion of the transmission request signal into a light signal and transmits the light signal to the third light receiving section 161. The third light receiving section 161 receives the light signal transmitted from the third light transmitting section 160, and performs light-to-electric conversion of the light signal to reconstruct the transmission request signal. Here, a light signal transmitted by the third light transmitting section 160 is not limited to the visible light signal, but may be an infrared light signal. Next, the third light receiving section 161 inputs the transmission request signal to the external interface section 162. The external apparatus connected to the external interface section 162 inputs transmission data to the external interface section 162 in accordance with the transmission request signal. Next, the transmission data is inputted from the external apparatus via the external interface section 162 to the control section 115, and transmission of the transmission data is started. As described above, in the first to fifth embodiments, it may be configured that transmission of the transmission data is started in accordance with the transmission request signal. Instead of the transmission request signal, another signal may be transmitted from the light receiving apparatus to the light transmitting apparatus. Further, a transmission request signal may be inputted from the third light receiving section 161 to the control section 115, and transmission of the transmission data may be started by the control section 115, to which the transmission request signal has been inputted, causing the external apparatus to output the transmission data. Further, although it is configured that the third light transmitting section 160 and the third light receiving section 161 are provided for transmitting a transmission request signal and optical free space transmission is performed, it may be configured that wireless transmission using radio waves such as Bluetooth, RF-ID, wireless LAN, and the like is performed.

Further, in the above first to fifth embodiments, any of: modulation such as M-PSK, M-ASK, and M-FSK which modulate phase, amplitude, frequency, or the like to an M value by using a carrier wave, QAM which modulates amplitude and phase by using a carrier, and the like; and multilevel digital modulation in which the frequency value of a digital signal is multileveled without using a carrier wave; and the like may be used as multilevel modulation performed by the first modulation section 113 and the second modulation sections 114, 453, and 460.

Further, in the above first, second, fourth, and fifth embodiments, it is preferred that the first light receiving section 121 does not receive an infrared light signal and the second light receiving section 122 does not receive a visible light signal.

Further, in the above first, second, fourth, and fifth embodiments, in order to improve the receiving sensitivity of the first light receiving section 121 which receives visible light and the receiving sensitivity of the second light receiving section 122 which receives infrared light for performing more stable high-speed communication, an optical filter which removes infrared light may be inserted between the first light receiving section 121 and the light transmitting apparatus 110, and an optical filter which removes visible light may be inserted between the second light receiving section 122 and the light transmitting apparatus 110. Alternatively, more stable high-speed communication may be performed using a general optical system (a condenser lens, and the like) regarding optical free space transmission.

Further, in the above first to fifth embodiments, because it is postulated that the visible light emitted by the first light transmitting section 111 is used as illumination, it is preferred that a visible light signal is subjected to PPM (Pulse Position Modulation). Thus, regarding the ON/OFF action of the visible light, "flickering of the illumination" felt by the naked eye due to the OFF action continued a large number of times can be prevented.

Further, in the above first to third and fifth embodiments, in infrared communication, communication is enabled at a significantly high speed by switching the number of levels in a modulation scheme, but communication may be enabled at a significantly high speed by switching a modulating speed. For example, all infrared light signals are considered to have been subjected to only binary digital modulation, and a modulating speed is made to be low during a period when the visible light is ON and to be high during a period when the visible light is OFF, thereby enabling communication at a significantly high speed.

Further, in the above first embodiment, the low-speed data included in the transmission data may be location information indicative of the installed location of the light transmitting apparatus 110. Thus, the location of the light receiving apparatus 120 which has received a visible light signal from the light transmitting apparatus 110 can be identified.

Further, it may be configured that a memory is provided in the control section 115 or the like of the light transmitting apparatus 110 or the like and the transmission data including the low-speed data, the high-speed data, and the like is stored once in the memory. In the case of connecting the external interface section 162 (see FIG. 13) to the external apparatus (not shown) via the Internet or the like, there is the possibility that the connection state changes with time and the transmission speed changes. However, by providing such a configuration to store once the transmission data in the memory, stable transmission can be achieved without being affected by the external connection state.

Further, in the above second and third embodiments, in the case where a plurality of light transmitting apparatuses 312 are installed, a spreading code generated by the spreading code generating section 310 of each light transmitting apparatus 312 may be uniquely assigned to the installed location of the light transmitting apparatus 312. Thus, the location of the light receiving apparatus which has received a visible light signal from a light transmitting apparatus 312 can be identified. Further, in the above, it is configured that the spreading code generating section 310 of each light transmitting apparatus 312 generates a spreading code. However, each light transmitting apparatus 312 may include a spreading code memory for storing a spreading code, instead of the spreading code generating section 310, and a spreading code may be inputted from the external interface section 162 (not shown in FIGS. 3 and 5, see FIG. 13) to the memory to be stored. Thus, it is possible to externally set and change the spreading code used in each light transmitting apparatus 312.

Further, in the above first to fifth embodiments, the first light transmitting section 111 may simultaneously activate light-emitting diodes which visible lights of three primary colors (red, blue, green), respectively, to emit white light, and may transmit a visible light signal to the light receiving apparatus by emitting/quenching at least one of the visible lights of the three primary colors.

INDUSTRIAL APPLICABILITY

Because the visible light is made to have an illumination function and a low-speed communication function while the infrared light is made to have a high-speed communication function, the optical free space transmission system according to the present invention is useful for application to a high-speed optical wireless communication system and the like. Further, the optical free space transmission system according to the present invention is applicable to the purpose of transmission of video signals and audio signals, and the like. Further, because the optical free space transmission system according to the present invention has an illumination function, the communication range can be clearly shown unlike a wireless transmission system using an electric signal, and the optical free space transmission system can be used as a spotlight by light distribution designing. Thus, the optical free space transmission system according to the present invention is useful for application to provision of detailed location information, provision of information regarding location in department stores, stations, and the like for public use, and the like, by installing a large number of light transmitting apparatuses.

The invention claimed is:

1. A light transmitting apparatus for transmitting transmission data using visible light and infrared light, the light transmitting apparatus comprising:
    a first modulation section for performing low-speed digital modulation of first data;
    a second modulation section for performing high-speed digital modulation of second data;
    a first light transmitting section for alternately emitting and quenching the visible light in accordance with an output signal of the first modulation section to transmit a visible light signal which conveys the first data;
    a second light transmitting section for changing an intensity of the infrared light in accordance with an output signal of the second modulation section to transmit an infrared light signal, which conveys the second data, in parallel with the visible light signal; and
    a control section, wherein
    the high-speed digital modulation performed by the second modulation section is standard modulation or high-rate transmission modulation having a higher data transmission rate than the standard modulation, and
    the control section causes the second light transmitting section to emit the infrared light signal in accordance with the output signal of the second modulation section, which has been subjected to the standard modulation, during a period of emitting the visible light signal, and to emit the infrared light signal in accordance with the output signal of the second modulation section, which has been subjected to the high-rate transmission modulation, during a period of quenching the visible light signal.

2. The light transmitting apparatus according to claim 1, wherein the control section separates the transmission data to obtain the first data and the second data.

3. The light transmitting apparatus according to claim 1, further comprising a spreading code generating section for generating a spreading code, wherein
    the first data is the spreading code,
    the second data is the transmission data, and
    after performing the standard modulation or the high-rate transmission modulation of the transmission data, the second modulation section spreads the transmission data by using the spreading code.

4. The light transmitting apparatus according to claim 3, wherein
    after performing the low-speed digital modulation of the spreading code, the first modulation section converts the spreading code into an electric signal of a low frequency band, and
    after spreading the transmission data, the second modulation section converts the transmission data into an electric signal of a high frequency band which does not overlap with the low frequency band.

5. The light transmitting apparatus according to claim 2, wherein the first data is information indicative of an installed location of the light transmitting apparatus.

6. The light transmitting apparatus according to claim 3, wherein the spreading code is uniquely assigned to an installed location of the light transmitting apparatus.

7. The light transmitting apparatus according to claim 1, wherein
    the second data is the transmission data, and
    the first data is a reference frequency signal used for generating a clock signal used for the high-speed digital modulation performed to the transmission data.

8. The light transmitting apparatus according to claim 1, wherein the first light transmitting section simultaneously activates light-emitting diodes, which emit visible lights of three primary colors, respectively, to emit white light, and transmits the visible light signal which conveys the first data by alternately emitting and quenching at least one of the visible lights of the three primary colors.

9. An optical free space transmission system comprising:
    a light transmitting apparatus for transmitting transmission data using visible light and infrared light; and
    a light receiving apparatus for receiving the transmission data, wherein
    the light transmitting apparatus includes:
        a spreading code generating section for generating a spreading code;
        a first modulation section for performing low-speed digital modulation of the spreading code;
        a second modulation section for performing high-speed standard digital modulation or high-rate transmission digital modulation, which has a higher data transmission rate than the high-speed standard digital modulation, of the transmission data, and for spreading the transmission data by using the spreading code;
        a first light transmitting section for alternately emitting and quenching the visible light in accordance with an output signal of the first modulation section to transmit a visible light signal which conveys the spreading code;
        a second light transmitting section for changing an intensity of the infrared light in accordance with an output signal of the second modulation section to transmit an infrared light signal which conveys the transmission data; and
        a control section for causing the second light transmitting section to emit the infrared light signal in accordance with the output signal of the second modulation section, which has been subjected to the high-speed standard digital modulation, during a period of emitting the visible light signal, and to emit the infrared light signal in accordance with the output signal of the second modulation section, which has been subjected to the high-rate transmission digital modulation, during a period of quenching the visible light signal, and
    the light receiving apparatus includes:
        a first light receiving section for receiving the visible light signal;

a second light receiving section for receiving the infrared light signal;
a first demodulation section for demodulating the spreading code from an output signal of the first light receiving section;
an inverse spreading section for inverse-spreading an output signal of the second light receiving section by using the spreading code; and
a second demodulation section for demodulating the transmission data from an output signal of the inverse spreading section.

10. The optical free space transmission system according to claim 9, wherein the first light transmitting section simultaneously activates light-emitting diodes, which emit visible lights of three primary colors, respectively, to emit white light, and transmits the visible light signal which conveys the spreading code by alternately emitting and quenching at least one of the visible lights of the three primary colors.

11. The optical free space transmission system according to claim 9, wherein
the light receiving apparatus further includes a third light transmitting section for transmitting a transmission request signal, which requests start of transmitting the transmission data, to the light transmitting apparatus by using a light signal,
the light transmitting apparatus further includes a third light receiving section for receiving the transmission request signal, and
the control section starts to transmit the transmission data in accordance with the transmission request signal.

12. The optical free space transmission system according to claim 9, wherein the spreading code is uniquely assigned to an installed location of the light transmitting apparatus.

* * * * *